(12) United States Patent
Ferrer et al.

(10) Patent No.: US 8,978,899 B2
(45) Date of Patent: Mar. 17, 2015

(54) FLUOROPOLYMER FINE FIBER

(75) Inventors: Ismael Ferrer, Minneapolis, MN (US);
Chuanfang Yang, Eden Prairie, MN (US)

(73) Assignee: Donaldson Company, Inc., Bloomington, MN (US)

( * ) Notice: Subject to any disclaimer, the term of this patent is extended or adjusted under 35 U.S.C. 154(b) by 1864 days.

(21) Appl. No.: 11/832,052

(22) Filed: Aug. 1, 2007

(65) Prior Publication Data

US 2009/0032475 A1   Feb. 5, 2009

(51) Int. Cl.
| | |
|---|---|
| *B01D 39/02* | (2006.01) |
| *B01D 46/54* | (2006.01) |
| *B01D 17/00* | (2006.01) |
| *B01D 39/16* | (2006.01) |
| *D01D 5/00* | (2006.01) |
| *D01D 10/00* | (2006.01) |
| *D01F 6/12* | (2006.01) |
| *D01F 6/32* | (2006.01) |
| *D06M 10/00* | (2006.01) |
| *D04H 1/728* | (2012.01) |
| *D04H 3/016* | (2012.01) |
| *B01D 24/00* | (2006.01) |
| *D06M 101/22* | (2006.01) |

(52) U.S. Cl.
CPC .............. *B01D 46/546* (2013.01); *B01D 17/10* (2013.01); *B01D 39/1623* (2013.01); *D01D 5/003* (2013.01); *D01D 10/00* (2013.01); *D01F 6/12* (2013.01); *D01F 6/32* (2013.01); *D06M 10/00* (2013.01); *D04H 1/728* (2013.01); *D04H 3/016* (2013.01); *B01D 2239/025* (2013.01); *D06M 2101/22* (2013.01)

USPC .......................................... 210/505; 210/504

(58) Field of Classification Search
USPC .................................. 210/505, 504
See application file for complete search history.

(56) References Cited

U.S. PATENT DOCUMENTS

| | | | |
|---|---|---|---|
| 3,142,612 A | | 7/1964 | Reiman |
| 3,297,161 A | | 1/1967 | Kasten |
| 3,976,572 A | | 8/1976 | Reick |
| 4,372,847 A | | 2/1983 | Lewis |
| 4,512,882 A | | 4/1985 | Fischer et al. |
| 4,522,712 A | | 6/1985 | Fischer et al. |
| 4,765,915 A | * | 8/1988 | Diehl ........................... 210/767 |
| 4,787,949 A | | 11/1988 | Cole et al. |

(Continued)

FOREIGN PATENT DOCUMENTS

| | | |
|---|---|---|
| EP | 1 674 508 A1 | 6/2006 |
| GB | 2 316 016 A | 2/1998 |
| JP | 2002-266219 | 9/2002 |

OTHER PUBLICATIONS

International Search Report and Written Opinion mailed Apr. 1, 2009.

(Continued)

*Primary Examiner* — Katherine Zalasky
(74) *Attorney, Agent, or Firm* — Mueting, Raasch & Gebhardt, P.A.

(57) ABSTRACT

A layer of fluoropolymer fine fiber can be made. The fine fiber can be made by electrospinning from a solvent or a solvent blend. The layers of the invention are useful in general filtration of fluid streams including gaseous and liquid streams. The fine fiber layers are also useful as hydrophobic filtration layers that can be used to separate water from a hydrocarbon stream.

55 Claims, 13 Drawing Sheets

(56) References Cited

U.S. PATENT DOCUMENTS

| | | | |
|---|---|---|---|
| 4,790,941 A | | 12/1988 | Taylor |
| 4,809,912 A | * | 3/1989 | Santini ............................ 239/60 |
| 4,814,087 A | | 3/1989 | Taylor |
| 4,850,498 A | | 7/1989 | Taylor |
| 4,886,603 A | | 12/1989 | Taylor |
| 5,202,023 A | * | 4/1993 | Trimmer et al. ........... 210/321.8 |
| 5,277,797 A | | 1/1994 | Hargest |
| 5,507,942 A | | 4/1996 | Davis |
| 5,797,378 A | | 8/1998 | Kato |
| 5,904,956 A | | 5/1999 | Kheyfets |
| 5,916,442 A | | 6/1999 | Goodrich |
| 5,989,318 A | | 11/1999 | Schroll |
| 5,993,675 A | | 11/1999 | Hagerthy |
| 6,012,485 A | | 1/2000 | Connelly et al. |
| 6,083,381 A | | 7/2000 | Connelly et al. |
| 6,103,181 A | | 8/2000 | Berger |
| 6,146,535 A | * | 11/2000 | Sutherland .................... 210/637 |
| 6,203,698 B1 | | 3/2001 | Goodrich |
| 6,371,087 B1 | | 4/2002 | Condran et al. |
| 6,422,396 B1 | | 7/2002 | Li et al. |
| 6,435,142 B2 | | 8/2002 | Harvey |
| 6,526,741 B2 | | 3/2003 | Whitehead et al. |
| 6,540,926 B2 | | 4/2003 | Goodrich |
| 6,576,034 B2 | | 6/2003 | Berger |
| 6,616,723 B2 | | 9/2003 | Berger |
| 6,723,461 B2 | | 4/2004 | Gorman et al. |
| 6,746,517 B2 | * | 6/2004 | Benson et al. ................. 95/273 |
| 6,764,598 B2 | | 7/2004 | Yu et al. |
| 6,828,054 B2 | | 12/2004 | Appleby et al. |
| 6,864,007 B1 | | 3/2005 | Iqbal et al. |
| 7,084,099 B2 | | 8/2006 | Radomyselski et al. |
| 7,114,621 B2 | * | 10/2006 | Hester et al. .................. 210/490 |
| 7,192,550 B2 | | 3/2007 | Berger et al. |
| 2004/0222156 A1 | | 11/2004 | Yu et al. |
| 2005/0109685 A1 | | 5/2005 | Fujita et al. |
| 2005/0274664 A1 | | 12/2005 | Stoehr et al. |
| 2006/0006109 A1 | | 1/2006 | Klein et al. |
| 2006/0131235 A1 | | 6/2006 | Offeman et al. |
| 2006/0283815 A1 | | 12/2006 | Wieczorek |
| 2007/0000779 A1 | | 1/2007 | Cramer et al. |
| 2007/0134151 A1 | | 6/2007 | Jo et al. |

OTHER PUBLICATIONS

Baumgarten, P., "Electrostatic Spinning of Acrylic Microfibers," *Journal of Colloid and Interface Science*, vol. 36, No. 1, pp. 71-79 (May 1971).

Ding, B. et al., "Formation of novel 2D polymer nanowebs via electrospinning," *Nanotechnology*, vol. 17, pp. 3685-3691 (2006).

Hughes, V., "Aviation Fuel Handling: New Mechanistic Insight into the Effect of Surfactants on Water Coalescer Performance," *Paper presented at the 2nd International Filtration Conference*, San Antonio, pp. 91-104 (Apr. 1-2, 1998).

Material Safety Data Sheet PVDF SOLEF®, *Solvay Advanced Polymers, Inc.*, pp. 1-8 (May 20, 1999).

Reneker, D. et al., "Nanometre diameter fibres of polymer, produced by electrospinning," *Nanotechnology*, vol. 7, pp. 216-223 (1996).

Wente, V., "Superfine Thermoplastic Fibers," *Industrial and Engineering Chemistry*, vol. 48, No. 8, pp. 1342-1346 (Aug. 1956).

Ebnesajjad, S., "Introduction to Fluoropolymers,", FluoroConsultants Group, LLC, http://fluoroconsultants.com/db4/00322/fluoroconsultants.com/_download/INTRODUCTIONTOFLUOROPOLYMERS.pdf (17 pages), available Oct. 28, 2007 via <http://www.archive.org>.

* cited by examiner

FLUOROPOLYMER FINE FIBER

FIELD OF THE INVENTION

The invention relates to fluoropolymer fine fiber nonwoven layers that can be used in filter applications. The invention also relates to fluoropolymer fine fiber nonwoven layers that can be used in separation of water from a fuel.

BACKGROUND OF THE INVENTION

Emulsified water contamination of fuel, particularly diesel fuel, jet fuel, biodiesel fuel, ethanol, butanol, or a blend thereof, is a serious concern for the operation of fossil fuel powered engines. Water can become stably entrained in such fuels, especially in diesel fuel formulations containing high concentrations of additives where the presence of water and waterbased impurities can cause fuel filter plugging, fuel starvation, damage of engine components by cavitation or corrosion, promotion of microbiological growth, and other problems.

Separation of contaminant water from fuel has posed a particularly challenging problem. Industrial water-in-oil emulsions can be separated by gravity, centrifugation, coalescence, absorption, distillation, and headspace dehumidification. Simple mechanical devices based on separation by gravity or mild centrifugal force are satisfactory if the free water is present as a discrete second phase. However, free water is often emulsified by pumps and valves, and may remain as a stable emulsion, especially in diesel or jet fuel saturated with surfactants. Two-stage coalescer/separators are designed to remove water emulsions. The coalescer breaks the emulsion by preferential wetting of fibrous materials such as fiber glass. The water is accumulated into large droplets and is removed by gravity separation against a hydrophobic separator material such as Teflon coated wire cloth or silicone impregnated paper. The presence of wetting agents or surfactants may interfere with the coalescence of water emulsions, especially in jet and diesel fuels.

The conventional mechanism of coalescence in a fibrous bed is explained by the Hazlett model. The model consists of four main steps: 1) approach of a droplet to a fiber, 2) attachment of the droplet to the fiber, 3) coalescence of attached droplets on the fiber, and 4) release of enlarged droplets from the downstream side of the fiber bed. Thus, coalescing water droplets from the hydrocarbon phase requires a hydrophilic site in a fibrous bed in order to attach water droplets to the fibers. The glass fiber medium applied in conventional coalescer devices has a surface which has both hydrophilic (e.g. silanol, cellulose) and hydrophobic (silicone, organic resin) regions. It is widely accepted that water interception and growth occurs at the hydrophilic sites. When surfactants are present in the fuel, the polar head of the surfactant can be adsorbed at the hydrophilic sites, causing failure of the coalescer unit. Failure can occur in two ways: the surfactants reduce interfacial tension and form a stable emulsion to prevent coalescence; or surfactants are adsorbed or coated on the fiber media, thereby changing characteristics such as wettability with regard to water, fuel, or both. This coating phenomenon has been evidenced by scanning electron microscopy (SEM). See Hughes, V. B., "Aviation Fuel Handling: New Mechanistic Insight Into The Effect Of Surfactants On Water-Coalescer Performance," 2nd International Filtration Conference, San Antonio, U.S., Apr. 1-2, 1998, pp. 92-104.

This invention is concerned with coalescence as a means to separate water from emulsions in fuel. In particular, the invention utilizes specialized nonwoven fine fiber webs to capture and remove water from fuel emulsions, even very stable emulsions. Further, the fine fiber webs of the invention can separate waterborne impurities, such as hard or soft particulates such as dust, aggregated organic matter, or even bacteria from fuels when the impurities are entrained in a water phase within a fuel.

Non-woven webs for many end uses, including filtration media, have been manufactured for many years. Such structures are disclosed in, for example, Wincklhofer et al., U.S. Pat. No. 3,616,160; Sanders, U.S. Pat. No. 3,639,195; Perrotta, U.S. Pat. No. 4,210,540; Gessner, U.S. Pat. No. 5,108,827; Nielsen et al., U.S. Pat. No. 5,167,764; Nielsen et al., U.S. Pat. No. 5,167,765; Powers et al., U.S. Pat. No. 5,580,459; Berger, U.S. Pat. No. 5,620,641; Hollingsworth et al., U.S. Pat. No. 6,146,436; Berger, U.S. Pat. No. 6,174,603; Dong, U.S. Pat. No. 6,251,224; Amsler, U.S. Pat. No. 6,267,252; Sorvari et al., U.S. Pat. No. 6,355,079; Hunter, U.S. Pat. No. 6,419,721; Cox et al., U.S. Pat. No. 6,419,839; Stokes et al., U.S. Pat. No. 6,528,439; Amsler, U.S. Pat. No. H2,086, U.S. Pat. No. 5,853,439; U.S. Pat. No. 6,171,355; U.S. Pat. No. 6,355,076; U.S. Pat. No. 6,143,049; U.S. Pat. No. 6,187,073; U.S. Pat. No. 6,290,739; U.S. Pat. No. 6,540,801; and U.S. Pat. No. 6,530,969; Chung et al., U.S. Pat. No. 6,743,273; Chung et al., U.S. Pat. No. 6,924,028; Chung et al., U.S. Pat. No. 6,955,775; Chung et al., U.S. Pat. No. 7,070,640; Chung et al., U.S. Pat. No. 7,090,715; and Chung et al., U.S. Patent Publication No. 2003/0106294. Such structures have been applied and made by both air laid and wet laid processing and have been used in fluid, both gaseous and air and aqueous and non-aqueous liquid filtration applications, with some degree of success.

Many filter materials made from nonwoven webs have been directed to separating water contamination from fuel streams, e.g. hydrocarbons that are liquids at ambient temperatures. These filter materials may take advantage of the Hazlett model for the mechanism of coalescence. For example, Reiman, U.S. Pat. No. 3,142,612, describes a fuel filter for separating out water having glass fibers, connected with islands of thermoplastic polymers by melting the polymers, and further coated with a hydrophobic agent such as a phenolic resin. Reick, U.S. Pat. No. 3,976,572, discloses a fuel chamber separated by a selectively permeable filter that only allows fuel to pass into the chamber leading to an engine; the filter is made of a polyester nonwoven coated and bonded to hydrophobically treated silica particles. Lewis, U.S. Pat. No. 4,372,847, describes a fuel filter assembly that includes a hydrophobically treated filter material for coalescing water while allowing fuel to pass through without coalescing. Fischer et al., U.S. Pat. Nos. 4,512,882 and 4,522,712, teach a hydrophobic coating on a paper-type filter element to separate water from fuel. Cole et al., U.S. Pat. No. 4,787,949 disclose hydrophilic superabsorbent materials covered by a nonwoven for sacrificial removal of water from fuel. Taylor, U.S. Pat. Nos. 4,790,941, 4,814,087, and 4,850,498 teaches the use of tangential flow filtration of fuel employing a plurality of microporous hydrophobic hollow fiber membranes to separate fuel from e.g. seawater. Davis, U.S. Pat. No. 5,507,942 discloses a vertical fuel filter that can have a hydrophobic coating on a paper nonwoven to prevent the passage of water into the engine. Kheyfets, U.S. Pat. No. 5,904,956 teaches a filter element for separating water from fuel that includes fibers having a first treatment of a cationic surfactant in an aromatic hydrocarbon solvent, followed by a silane surface treatment. Goodrich, U.S. Pat. Nos. 5,916,442, 6,203,698, and 6,540,926 discloses an annularly spaced, vertical filter assembly that separates water from fuel by gravity as the fuel flows upward through the narrow annular channel. The filtering means can be a hydrophobic media that prohibits the passage of water through the media. Schroll, U.S. Pat. No. 5,989,318 teaches a filter assembly wherein a hydrophobic filter is disposed between the fuel intake and the engine to prevent water from passing into the engine. Hagerthy, U.S. Pat. No. 5,993,675 discloses use of a plurality of petroleum sorbent filter elements, constructed from multiple adjacent microfiber layers that allow fuel but not water to pass through. Surface layers contacting the fuel source can be heated to coalesce and bond the fibers.

Berger, U.S. Pat. Nos. 6,103,181, 6,576,034, 6,616,723, and 7,192,550 discloses a nonwoven web of fibers having more than one fiber type or more than one component per fiber (e.g. bicomponent fibers); several applications for such fibers are disclosed, such as separation of water from aviation fuel. Fluorocarbon and chlorocarbon polymers are provided as possible components of filter fibers for dust collection from e.g. air. Condran et al., U.S. Pat. No. 6,371,087 teach a filter coated with phenolic resin containing silicone to separate water from fuel in a locomotive fuel application. Li et al., U.S. Pat. No. 6,422,396 teach a hydrophobic filter medium having a coalescing layer of fine fiber and a negative porosity gradient to promote enlargement of trapped liquid droplets. Whitehead et al., U.S. Pat. No. 6,526,741 disclose a fuel filter media having a prefilter and a hydrophobic water coalescing media, wherein the prefilter protects the coalescing filter from particulate clogging. Gorman et al., U.S. Pat. No. 6,764,598 disclose a hydrophobic depth filter and a PTFE cross-flow membrane filter that separates and coalesces surfactant and water contaminants from fuel. Yu et al., U.S. Patent Pub. No. 2004/0222156 teach an apparatus for filtration of surfactant and water from fuel, having a hydrophobic water coagulation depth filter cartridge and a hydrophobic water separation cartridge. Klein et al., U.S. Pat. Pub. No. 2006/0006109 disclose a serially connected particle and coalescing filter, wherein the coalescing filter is a hydrophobic nonwoven that separates water from fuel without exhibiting any particle filtration properties.

Fluorinated polymers have occupied a predominant place among the specialty polymers, as their unique combination of properties has made them the materials of choice in a wide number of areas. Fluoropolymers' outstanding chemical inertness, low surface energy, along with remarkable mechanical and heat tolerance properties, find them applications that span a wide range of technological areas. Other properties of importance, such as low flammability and low temperature flexibility, are also typical of fluoropolymers. The ubiquitous example of the chemical inertness and temperature resistance is the fully fluorinated PTFE, which properties in that regard are unmatched, and which since its insertion in the market has constituted an important component in a large number of durables and consumables.

The prior art contains disclosures of fluoropolymers used in making nonwoven layers. Fletcher et al., U.S. Pat. Nos. 3,956,233 and 4,094,943, teach conventional filament comprising block urethanes combined with fluoropolymer materials for increasing flame retardancy in nonfluorinated polymers used to make fabrics. Pall et al., U.S. Pat. Nos. 4,594,202 and 4,726,901, teach melt blown processed fluoropolymer fiber materials. Karbachsch et al., U.S. Pat. No. 4,983,288, teach the use of PVDF or PTFE for use in the membrane type filter materials. McGregor et al., U.S. Pat. No. 5,264,276, teach a laminate structure that can be made of a variety of porous fluoropolymers. A layer comprising a non-porous layer and a fibrous layer is used. The fiber layer can comprise Viton® type elastomer materials. Walla et al., U.S. Pat. No. 5,908,528, teach a protective reinforced fibrous fluoroelastomer layer that can contain a nanofiber. Cistone et al., U.S. Publication No. 2002/0155289 A1, teach melt processable woven, non-woven and knitted fluoropolymer structures for use in filters and support media.

None of the prior art references are drawn to electrospinning of fluoropolymer solutions to provide a fine fiber layer. Electrospinning has emerged as a convenient technique for the fabrication of micro and nanoscale objects, and it is particularly useful in the fabrication of fibrous matrices. In the fabrication of fibers electrospinning has an advantage over traditional technologies, such as melt-spinning and melt-blowing, of operating at room temperature. Another significant advantage, and one that is unique to electrospinning, is its ability of producing fibers in the submicron scale.

Electrospinning is typically carried out from a polymer solution, wherein the solvent is the major component. A hypodermic needle, nozzle, capillary or movable emitter provides liquid solutions of the polymer that are then attracted to a collection zone by a high voltage electrostatic field. As the materials are pulled from the emitter and accelerate through the electrostatic zone, the fiber becomes very thin and can be formed in a fiber structure by solvent evaporation. Such techniques are described by, for example, Reneker, D. et al., "Nanometer diameter fibres of polymer, produced by electrospinning," *Nanotechnology*, vol. 7, pp. 216-223 (1996); and Baumgarten, P., "Electrostatic Spinning of Acrylic Microfibers", *J. Colloid and Interface Sci.* vol. 36, No. 1, 9 pages (May 1971).

Of the fluorinated homopolymers, only a selected number of them are soluble in organic solvents at room temperature. One of the few known solvents for fluorinated homopolymers are fluorinated solvents. For example, Tuminello et al., U.S. Pat. Nos. 5,328,946 and 5,683,557 describe perfluorinated cycloalkane solvents for dissolving high melting polymers containing tetrafluoroethylene. These solvents are expensive and can be detrimental to the environment. Other fluorinated homopolymers are soluble in organic solvents that are undesirable to use for electrospinning. For example, poly(vinylidene fluoride), a fluorinated homopolymer, is only soluble in highly polar aprotic solvents such as DMF, DMAC, and the like.

Because of their very high hydrophobicity, fluorinated materials have potential as barrier filter materials to remove water from contaminated fuel, even where the water is emulsified and therefore not separable by conventional means. Fine fiber filters made by electrospinning are excellent candidates for such a filter. However, fluorinated polymers are generally poor candidates for electrospinning due to solubility issues. If the material under consideration for electrospinning requires the use of hazardous solvents, this can provide either major solvent management challenges or make the process prohibited altogether. Additionally, the choice of solvent in electrospinning has a significant impact on the final morphological features of the matrix, as well as the stability and productivity of the process. It is therefore desirable to employ the safest solvents, while ensuring stability and continuity of the process, and providing the expected quality and performance of the resulting fine fiber webs.

Thus, there is a need in the industry for a coalescing filter material made by electrospinning fluoropolymers having solubility in relatively benign solvents. There is a further need in the industry for a filter construction that can effectively remove emulsified water particles from fuel materials.

SUMMARY OF THE INVENTION

The invention relates to a fine fiber, a fine fiber layer, a fine fiber web or the use of such structures in a filter media element or cartridge. Such a media can be used in a filter structure. We have discovered that certain fluoropolymers employed in coatings can be successfully electrospun from relatively benign solvents to form fine fibers with surprising properties.

Copolymerization of fluorinated monomers with a relatively low fraction of a second fluorinated monomer can expand the solubility of the resulting polymer to a larger selection of solvents without affecting some of the most important properties to any significant extent. In fact, the introduction of a mixture of fluorinated monomers can enhance some of performing properties of these materials. An ample selection of these soluble fluoropolymers are commercially available, which development has been driven mainly by the need of high performance protective coatings.

A family of fluoropolymers that we have found to be particularly amenable to electrospinning are the copolymers of vinylidene fluoride ($VF_2$) with hexafluoropropylene (HFP), having HFP content below 20 mole %. Above 20 mole % HFP content, the polymer becomes amorphous, behaving more like an elastomeric material. Although these elastomeric materials exhibit similar solubility properties to their semicrystalline counterparts, the morphology and properties of fibers fabricated from them are markedly different. These materials are typically polymerized via suspension or emulsion polymerization conditions in a heterogeneous of homogeneous fashion.

The inclusion of as little as 3% of HFP into polyvinylidene fluoride (PVDF) chains disrupts the polymer crystallinity noticeably, changing the solubility properties of the materials and shifting its melting point. However, depression in melting point (e.g. from 167° C. to 145° C.) is outweighed by the benefits of the polymer solubility in low molecular weight ketones and esters at room temperature, and at concentration as high as 20% solids content. Unlike PVDF, which is only soluble in highly polar aprotic solvents (e.g. DMF, DMAC, etc.), PVDF-co-HFP copolymers can be electrospun from more convenient, safer solvent systems.

One such copolymer has been electrospun from acetone. Jo, J. I.; Kim, C.; Sang, Park, S. H.; Kap, S. Y. *Journal of the Korean Fiber Society* 2004, 41, 265. These authors reported having obtained fiber diameter ranges form 0.8 µm to 1.2 µm by varying the solution concentration and some of the process parameters. We have observed similar results, but for some of the fluoropolymers we have studied we have observed fiber diameters from significantly less than 1 micron up to about 10 microns (see, e.g., FIGS. 1 and 7).

We have discovered that acetone as the sole solvent in an electrospinning solution may not sustain, in every case, a continuous and stable process for any of the polymers tested. This is not surprising because it is well documented that solvents with high evaporation rates tend to progressively dry the base of the liquid jet to result in complete plugging of the spinneret, which is a narrow needle and thus prone to clogging problems. In order to mitigate and/or eliminate this problem we have arrived to solvent compositions that can sustain the process for prolonged periods of time and produce fibers of high quality. Specifically, we have found that addition of ethyl lactate at concentrations between 5% and 50% weight percent of a solvent mixture, wherein the balance is acetone, is a preferred solvent blend for electrospinning the fine fiber webs of the invention. Solutions of fluoropolymers in this solvent blend can be effectively electrospun into fibers matrices of high quality (see, e.g., FIG. 19). Ethyl lactate is a high boiling point solvent (154° C.) with excellent acceptance in industrial processes due to its biodegradability and relatively low toxicity.

Results similar to PVDF-co-HFP in properties for a fine fiber web can be obtained via the incorporation of tetrafluoroethylene (TFE) into the PVDF chains to form, PVDF-co-TFE. Like PVDF-co-HFP, PVDF-co-TFE has remarkable solubility in ketones and esters, and in decreased crystallinity. An example of a commercial PVDF-co-TFE material is Kynar® SL (Arkema, Inc. of Philadelphia, Pa.). Terpolymers having both HFP and TFE included in PVDF chains can also result into polymers with different degrees of crystallinity and enhanced solubility in ketones and esters. For example, Dyneon™ THV 220, from the Dyneon LLC of Oakdale, Minn., and Kynar® ADS, by Arkema, Inc., are example of commercial PVDF-co-HFP-co-TFE with different properties. We have electrospun THV 220A into good quality fiber webs. (FIGS. 1 and 2).

Other fluorine containing polymers soluble in ketones and esters and that can be fabricated into fine fibers via electrospinning also include copolymers of PVDF with chlorotrifluoroethylene, or PVDF-co-CTFE. These materials can be polymerized via suspension or emulsion polymerization conditions in a heterogeneous of homogeneous fashion, similarly to copolymerization of $VF_2$ with fluorinated monomers. The melting points of materials copolymerized heterogeneously are almost identical to those of PVDF. Therefore, in this case the gains in solubility are not at the expense of a decrease in melting temperature. Solvay S. A. of Brussels, Belgium commercializes various grades of this material under the trade name Solef® 3100 and 3200 series, and Arkema Inc. of Philadelphia, Pa. offers one grade under the trade name Kynar® 5050 HD.

Any of the fluoropolymers described above can be used to form fine fiber nonwoven webs by employing the technique of electrospinning from a relatively benign solvent. The fine fiber webs have unique properties, such as high hydrophobicity, that enable their use in applications such as filtering water and waterbased impurities from fuels. Preferably, the fine fiber webs are woven directly onto a substrate that is a fuel filter or another filter type substrate. In this manner, a fuel filter capable of removing water contaminant from fuel can be easily formed.

An advantage of the invention is that electrospun webs such as the webs of the invention are relatively solvent free upon reaching the destination substrate. In terms of compatibility of the electrospun webs with the substrate, electrospinning can be advantageously employed using nearly any desirable substrate, as the solvents used will not interact with the substrate and cause dissolution, deterioration, weakening, or penetration of the substrate beneath the electrospun polymer. Thus, a wide range of substrates can be employed with the fluorocarbon fine fiber webs of the invention. Nonlimiting examples of the substrate on which the fluoropolymer fine fiber filtration layer can be formed include silicone impregnated cellulose, such as those that can be purchased from Ahlstrom Corporation of Bishopville, S.C., spunbond Reemay® from Fiberweb PLC of Old Hickory, Tenn., or meltblown polyester from Hollingsworth & Vose Company of East Walpole, Mass.

Once deposited on the substrate, the fluorocarbon fine fiber nonwoven webs of the invention can be crosslinked. Any technique generally known in the art can be used to crosslink the webs. Crosslinking imparts desirable properties to the webs of the invention, such as thermal and dimensional stability. As crosslinking can occur between different fibers in the nonwoven layer, a fiber can be covalently bonded to its adjacent neighbor. This renders the fluoropolymers themselves, as well as the pore sizes and fiber dimensions of the filter layer formed by the fine fiber webs of the invention, highly stable to the heat and pressure exerted in e.g. fuel filtration applications. The preferred technique for crosslinking the fluorocarbon fine fiber webs of the invention is the electron beam crosslinking.

Once formed and supported on a substrate, the fine fiber webs of the invention can advantageously be used, for example, to filter water and waterbased impurities from fuel such as jet fuel and diesel fuel.

DETAILED DESCRIPTION OF THE INVENTION

Figure 1:
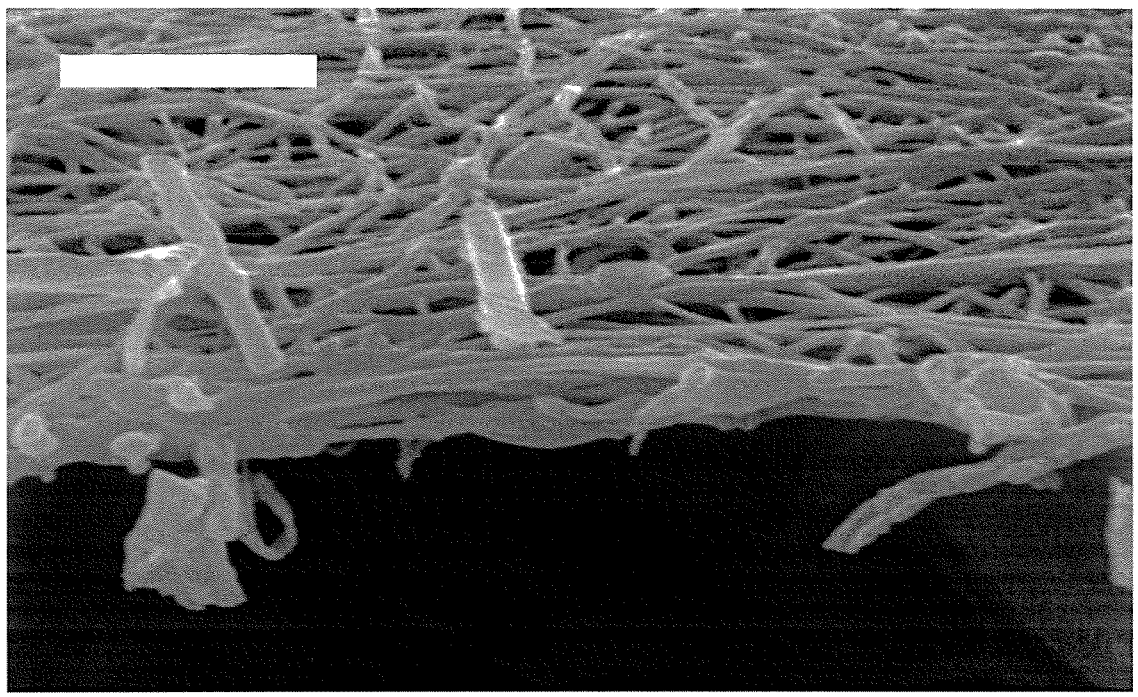
FIG. 1 is an SEM micrograph of an embodiment of the fine fibers of the invention.

"About" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

"Optional" or "optionally" means that the subsequently described event or circumstance may but need not occur, and that the description includes instances where the event or circumstance occurs and instances in which it does not. For example, "A optionally B" means that B may but need not be present, and the description includes situations where A includes B and situations where A does not include B.

"Includes" or "including" or like terms means "includes but not limited to."

The present invention may suitably comprise, consist of, or consist essentially of, any of the disclosed or recited elements. Thus, the invention illustratively disclosed herein can be suitably practiced in the absence of any element which is not specifically disclosed herein.

As used herein, the term "water", "water phase", and "aqueous phase" can be used interchangeably to refer to water and, optionally, waterbased impurities. As used herein, the term "waterbased impurities" means any material that is capable of being carried along in a water phase by virtue of solubility or emulsification, including gaseous, liquid, and solid materials. Without limiting these materials in any way, examples of materials that can be entrained in a water phase include dust or dirt, aggregates of organic matter, solid or liquid particulate matter, bacteria, and the like. It is not a requirement that these materials are actually in a water phase.

As used herein, the term "hydrophobic" means a fine fiber fluoropolymer layer wherein the fluoropolymer or blend of fluoropolymers has an inherent contact angle of at least 90° when formed into a flat film or sheet.

As used herein, the term "fine fiber" means a fiber having a diameter of less than 10 microns.

As used herein, the term "capture" as it applies to water means the mechanism of using the fluoropolymer fine fiber of the invention to remove emulsified water from hydrocarbon liquids. Several factors can affect water capture, including the inherent water repellency of the polymer or polymer blend, fiber size or diameter, layer thickness, pore size, emulsion stability of the hydrocarbon liquid, and the tendency of the fiber surface to absorb surfactants. In various embodiments, "capture" can mean "remove" or "coalesce" for example.

The fluoropolymers useful in making fine fiber and fine fiber layers for use in the invention are perfluorinated or partially fluorinated polymers made with monomers containing one or more atoms of fluorine, or copolymers of two or more of such monomers or copolymers of one or more monomers containing one or more atoms of fluorine with a monomer containing one or more atoms of chlorine. Common examples of fluorinated monomers useful in these polymers or copolymers include tetrafluoroethylene (TFE), hexafluoropropylene (HFP), vinylidene fluoride (VDF), perfluoroalkylvinyl ethers such as perfluoro-(n-propyl vinyl)ether (PPVE) or perfluoromethylvinylether (PMVE), acrylates such as perfluorooctyl acrylate, perfluorobutyl acrylate, and perfluorooctylsulfonamidoethyl acrylate.

Other copolymerizable olefinic monomers, including nonfluorinated monomers, can also be present in the copolymers or terpolymers used to make the fine fiber webs of the invention. Nonfluorinated monomers that can be copolymerized with one or more fluorine containing monomers include vinyl chloride, ethylene, propylene, or methyl vinyl ether and monomers containing one or more atoms of fluorine, such as tetra- and trifluoroethylene, vinylidine fluoride, vinyl fluoride, hexafluoropropylene, hydropentafluoropropylene, chlorotrifluorethylene, hexafluoroisobutylene, fluorovinyl ether, perfluoropropyl vinyl ether, perfluoromethyl vinyl ether, fluoroethylene vinyl ether, or perfluoro-2,2-dimethyl dioxole.

For the purposes of this application, expression of percent monomer content in a copolymer of interest means, unless it is stated otherwise, mole percent of the monomer as a fraction of the polymeric structure.

A group of useful materials is the ethylene-tetrafluoroethylene (ETFE) copolymers. These polymers have melt temperatures of about 250° to 275° C. and melt flow indexes at 297° C. under a 5 kg load of about 1-30 g-10 min$^{-1}$). Exemplary fluoropolymers are available commercially under the trade name Dyneon™ ET from Dyneon LLC, Oakdale, Minn. For example, ET 6210A is a copolymer of roughly 50% TFE, wherein the ethylene and TFE groups are alternating.

Yet another group of useful materials for the electrospinning of the fine fibers of the invention are hexafluoropropylene-tetrafluoroethylene (FEP) copolymers (melting temperature about 250 to 275° C.; melt flow index at 372° C. under a 5 kg load of about 1-30 g-10 min$^{-1}$). Exemplary fluoropolymers are available commercially under the trade name Dyneon™ FEP from Dyneon LLC, Oakdale, Minn. Exemplary materials include FEP 6301, 6303, and 6307.

Yet another group of useful materials for the electrospinning of the fine fibers of the invention is tetrafluoroethylene-perfluoro(alkoxy alkane) (PFA) copolymers having melt temperatures of about 300° to 320° C. and melt flow index at 372° C. under a 5 kg load of about 1-30 g-10 min$^{-1}$. Another group of useful materials is the hexafluoropropylene-tetrafluoroethylene-ethylene (HTE) terpolymers. These materials have melt temperatures of about 150° C. to 280° C. and melt flow indexes at 297° C. under a 5 kg load of about 1 to 30 g-10 min$^{-1}$.

Also useful are vinylidene fluoride polymers primarily made up of monomers of vinylidene fluoride, including both homo polymers and copolymers. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropylene, vinyl fluoride, pentafluoropropylene, and any other monomer that readily copolymerizes with vinylidene fluoride. These materials are further described in U.S. Pat. No. 4,569,978 (Barber), which is incorporated herein by reference.

Preferred copolymers are those composed of from at least about 70 and up to 99 mole % vinylidene fluoride, and from about 1 to 30 mole % tetrafluoroethylene, such as disclosed in British Patent No. 827,308; and about 70 to 99% VF$_2$ vinylidene fluoride and 1 to 30 percent hexafluoropropylene (see for example U.S. Pat. No. 3,178,399); and about 70 to 99 mole % vinylidene fluoride and 1 to 30 percent trifluoroethylene, terpolymers of vinylidene fluoride, trifluoroethylene and tetrafluoroethylene such as described in U.S. Pat. No. 2,968,649 and terpolymers of vinylidene fluoride, trifluoroethylene and tetrafluoroethylene are also representative of the class of vinylidene fluoride copolymers which are useful in this invention. Such materials are commercially available under the Kynar® trademark from Arkema Group located in Phildelphia, Pa. or under the Dyneon™ PVDF trademark from Dyneon LLC of Oakdale, Minn.

Additional fluorocarbon elastomer materials can also be used in the fiber materials of the invention. Fluoroelastomers contain VF$_2$ and hexafluoropropylene (HFP) monomers and optionally tetrafluoroethylene (TFE) and have a density greater than 1.8 gm-cm$^{-3}$. These fluoropolymers exhibit good resistance to most oils, chemicals, solvents, and halogenated hydrocarbons, and an excellent resistance to ozone, oxygen, and weathering. Their useful application temperature range is −40° C. to 300° C. Fluoroelastomer examples include those described in detail in Lentz, U.S. Pat. No. 4,257,699, as well as those described in Eddy et al., U.S. Pat. No. 5,017,432 and Ferguson et al., U.S. Pat. No. 5,061,965. The disclosures of each of these patents are incorporated herein by reference in their entirety.

A variety of these polymers are commercially available. Arkema, Inc. of Philadelphia, Pa. markets these materials under the trade name Kynar®. In some embodiments, we have found Kynar® 2500, 2700, and 2800 series to be excellent fiber formers when electrospun from ketones and esters. These materials cover a wide range of degree of crystallinity, molecular weights, composition, etc. Solvay S. A. of Brussels, Belgium also commercializes similar fluorinated copolymer materials under the trade names Hylar® SN and Solef® 21000 series (e.g. Solef® 21108, Solef® 21216, and Solef® 21508).

Terpolymers of TFE, HFP, and VF$_2$ have melt temperatures of about 100° C. to 260° C. and melt flow indexes at 265° C. under a 5 kg load of about 1 to 30 g-10 min$^{-1}$. Exemplary fluoropolymers are available commercially under the trade name Dyneon™ THV from Dyneon LLC, Oakdale, Minn. Exemplary materials include THV 500G, THV 220G, THV 510D (a waterbased latex dispersion of THV 500 polymer), THV 610G, and THV 815G. Another useful terpolymer is Kynar® ADS from Arkema, Inc. of Philadelphia, Pa.

Results similar to PVDF-co-HFP in properties for a fine fiber web can be obtained via the use of PVDF-co-TFE. Like PVDF-co-HFP, PVDF-co-TFE has remarkable solubility in ketones and esters, and in decreased crystallinity. An example of a commercial PVDF-co-TFE material is Kynar® SL (Arkema, Inc. of Philadelphia, Pa.).

Fluorinated poly(meth)acrylates can generally be prepared by free radical polymerization either neat or in solvent, using radical initiators well known to those skilled in the art. Other monomers which can be copolymerized with these fluorinated (meth)acrylate monomers include alkyl (meth)acrylates, substituted alkyl (meth)acrylates, (meth)acrylic acid, (meth)acrylamides, styrenes, vinyl halides, and vinyl esters.

The fluoropolymers can further comprise polar constituents. Such polar groups or polar group containing monomers may be anionic, nonionic, cationic, or amphoteric. In general, the more commonly employed polar groups or polar group-containing organic radicals include organic acids, particularly carboxylic acid, sulfonic acid and phosphonic acid; carboxylate salts, sulfonates, phosphonates, phosphate esters, ammonium salts, amines, amides, alkyl amides, alkyl aryl amides, imides, sulfonamides, hydroxymethyl, thiols, esters, silanes, and polyoxyalkylenes, as well as other organic radicals such as alkylene or arylene substituted with one or more of such polar groups.

The latex fluoropolymers described herein are typically aqueous dispersed solids but additional solvents can be used. The fluoropolymer can be combined with various solvents to form emulsions, solutions, or dispersions in a liquid form. Dispersions of fluoropolymers can be prepared using conventional emulsion polymerization techniques, such as described in U.S. Pat. Nos. 4,418,186; 5,214,106; 5,639,838; 5,696,216 or *Modern Fluoropolymers*, Edited by John Scheirs, 1997 (particularly pp. 71-101 and 597-614).

Latex fluoropolymers are available wherein the polymers comprise PFA, FEP, ETFE, HTE, THV and PVDF. Fluoropolymer materials supplied in solution or dispersion can be further diluted in order to deliver the desired concentration. Although aqueous emulsions, solutions, and dispersions are preferred, up to about 50% of a cosolvent such as methanol, isopropanol, acetone, methyl ethyl ketone, or methyl perfluorobutyl ether may be added. Preferably, the aqueous emulsions, solutions, and dispersions comprise less than about 30% cosolvent, more preferably less than about 10% cosolvent, and most preferably the aqueous emulsions, solutions, and dispersions are substantially free of cosolvent.

The copolymers described above can be dissolved in solutions of solvent such as DMF, DMAC, and THF, low molecular weight ketones such as methyl ethyl ketone and acetone, as well as other solvents such as ethyl acetate and 4-methoxy-4-methyl-2-pentanol. The solutions from which the fine fiber webs of the invention can be electrospun are not particularly limited as to solvent type. Solvent blends can also be used and can include a blend of the solvents listed above as well as solvents not specified herein. Without limiting the solvents used to electrospin the fine fiber webs of the invention, in some embodiments it is preferable to include about 70 to 95 weight percent of at least one of DMF, DMAC, THF, methyl ethyl ketone, acetone, ethyl acetate, and 4-methoxy-4-methyl-2-pentanol. In some embodiments it is preferable to combine the primary solvent with ethyl lactate. Preferred cosolvents for use with ethyl lactate are acetone and methyl ethyl ketone, with acetone being the most preferred. Ethyl lactate can be used as about 5 to 50 weight percent of the solvent mixture in some embodiments of the invention, preferably about 20 to 50 weight percent of the solvent mixture, and most preferably about 25 to 35 weight percent of the mixture.

Solutions of fluoropolymers supplied in solid form can generally be formed by combining polymer and solvent with mechanical stirring, usually with addition of heat, e.g. from about 30° C. to 60° C., though the dissolution technique is not particularly limited. Agitation and heat are continued until a homogeneous solution is formed. The solutions are typically cooled to room temperature prior to electrospinning. The concentration of polymer in solution can be very low, e.g. about 1-2 weight percent, or can be as high as 40 weight percent. Typically, about 9 weight percent to about 30 weight percent polymer can be dissolved in an electrospinning solution of the invention. The polymer solutions described above can be formed into fine fiber layers using standard electrospinning techniques, such as those described in Chung et al., U.S. Pat. No. 6,743,273, which is incorporated herein by reference. In some embodiments, the fine fibers of the invention can be from about 0.1 microns to 10 microns in diameter. In other embodiments, the fine fibers can be from about 0.1 to 1 micron in diameter. In still other embodiments, the fine fibers of the invention can be from about 0.3 to 1.0 microns in diameter. In still other embodiments of the invention, the fine fibers of the invention can be from about 0.3 to 0.5 microns in diameter.

The fine fiber layers of the invention comprise a random distribution of fine fibers which can be bonded to form an interlocking net. Filtration performance is obtained largely as a result of the fine fiber barrier to the passage of particulate. Structural properties of stiffness, strength, pleatability are provided by the substrate to which the fine fiber is adhered. The fine fiber interlocking networks have as important characteristics, the dimensions of fine fibers, defined as fiber diameter of 10 microns or less, as well as relatively small spaces between the fibers. Such interfiber spacing can range from about 0.01 to 25 microns or about 0.1 to 10 microns.

The fine fiber webs of the invention can be formed in a variety of thicknesses when formed as a layer alone or on top of a substrate, such as a filter substrate. For example, in some embodiments, the fine fiber layers of the invention can be about 0.3 to 5 microns thick when the layer is viewed at an angle 90° from the angle of fiber deposition. In other embodiments, a web of fine fibers can be electrospun wherein the layer of fibers is 1-5 fibers thick when the layer is viewed at an angle 90° from the angle of fiber deposition. In other embodiments, the fine fiber of the invention can be formed in mats 30 microns thick or more. The thickness of the fine fiber webs of the invention can be tailored for ideal layer thickness for use in any desired application, and the fine fiber layers of the invention are not particularly limited as to thickness.

The fine fiber layers of the invention can be advantageously spun onto a substrate useful for the envisioned application. For example, in a filter application, the fine fiber webs of the invention can be electrospun onto a prefilter, a filter layer, a woven or nonwoven cellulose or synthetic polymer backing, a scrim, a fuel filter substrate, a high efficiency particulate air filter, or any other substrate. Since the solvent in electrospinning does not come into contact with the substrate, there is complete freedom in choosing the substrate material. In addition, the low fine fiber layer thickness achievable with electrospinning can translate directly to enhancement of the filter flux. In these ways, at the outset, the fine fiber webs of the invention can be advantageously used over, for example, cast fluoropolymer membranes, which provide thicker layers and which further necessitate contact of the casting solvent with the filter backing.

In fuel filter applications, some embodiments employ a backing made from a nonwoven cellulose. For example, products such as 15PS-11, from the Ahlstrom Corporation of Bishopville, S.C., can be advantageously used as a substrate of the invention onto which a fine fiber web is electrospun. Other exemplary substrates include FF6168 from the Hollingworth & Vose Company of East Walpole, Mass.; and Reemay® 2008E from FiberWeb PLC of Old Hickory, Tenn.

The filter products comprising a fine fiber layer and a cellulosic layer, for example, can be thin or thick thin with a choice of appropriate substrate. The fine fiber can add less than a micron in thickness to the overall fine fiber plus substrate filter media. In other applications, it can be useful to provide a fine fiber layer that is thicker than one micron. Without particularly limiting the preferred thickness of a combination of fluorocarbon fine fiber and substrate, we have found in applying the fine fiber webs of the invention that useful total thickness of fine fiber combined with a substrate can range from about 50 microns to about 4 millimeters. In fuel filtration applications, for example, it can be preferable to have an overall filter thickness of about 500 microns to 1 millimeter, or about 200 microns to 2 millimeters. In air particulate filter applications, it can be preferable to have an overall filter thickness of about 300 to 500 microns, or about 200 microns to 1 millimeter. In yet other applications, it can be preferable to have an overall thickness of substrate plus fine fiber web of about 150 to 300 microns, or about 50 to 500 microns.

The fluoropolymer fine fiber can be fashioned into useful product formats. This fine fiber can be made in the form of an improved multi-layer microfiltration media structure. For example, filter employing the fluoropolymer fine fibers of the invention can be advantageously employed in a pleated filter format, such as in engine liquid filtration products. In other embodiments the fine fibers can be electrospun onto a spunbond polyester scrim first, then the scrim with the fine fiber is laminated on a cellulose substrate with the fine fiber sandwiched in between the scrim and the cellulose. By doing so, the fine fiber is well protected from delamination from the cellulose. The media can then be pleated and made into a filter housing for application.

In fuel filter applications wherein the fluoropolymer fine fiber layers of the invention are used to capture water from fuel, the fine fibers are preferably spun onto a fuel filtration substrate or other substrate layer, or spun onto a scrim layer and subsequently sandwiched with a filtration substrate layer such that the fine fiber is disposed between the scrim and the filtration substrate layer. The fine fiber layer can then provide separation of water from fuel when the fuel is passed in a stream through the filter element having the fine fibers of the invention disposed thereon or therein. In such embodiments, the filtration substrate layer is attached to the fine fiber using an adhesive or by application of heat. Gravure type rollers can be used to apply adhesive, for example. In general, any of the known means to apply a filter substrate to a layer of fine fiber may be used. In some embodiments, the layers can be combined using an adhesive laminator such as Gravure laminator where hot-melt polyurethane adhesive is applied to one substrate, and onto which the other substrate with fine fibers on it is laminated. The lamination technology can also be a thermal lamination process where heat is applied for the two substrates to be bonded with a binder initial put on the surface of the substrate without fine fibers.

The fine fiber layers of the invention can also be used to filter other fluid materials, such as air or another gas, to remove particulate matter therefrom. For example, the fine fiber layers can be used to remove water vapor or aerosols from an air stream. Oily aerosols can be removed from waste air streams due to the inherent oleophobicity of fluorocarbon fine fibers. The applications in which the fine fibers of the invention can be employed are not particularly limited by this disclosure. The skilled artisan will appreciate that fine fiber layers made from fluoropolymer can be useful for many different applications due to the unique properties of fluorinated materials.

The fluorocarbon fine fiber layers of the invention can have further treatments that can be added after electrospinning to affect the surface energy of the fibers or impart some other property. Nonlimiting examples of materials that can be added include antioxidants, antibacterial agents, flame retardant agents, pigments or other colorants, and the like.

In some embodiments, the fine fibers of the invention can be sandwiched between two more layers of one or more substrates. The two or more substrates can be cellulose, a blend of cellulose and glass, a blend of cellulose and polyester meltblown, a blend of fiber glass and meltblown polyester, a resin saturated meltblown polyester, or a blend of nylon with the other fibers as said above. In some embodiments, at least one of the substrate layers is a scrim layer. The scrim can be polyester such as those made by FiberWeb PLC of Old Hickory, Tenn. with basis weight range from about 15 to 75 g/m$^2$; the scrim can also be nylon with the similar basis weight range, such as Cerex® made by Cerex Advanced Fabrics of Pensacola, Fla. The lamination of the layers can be accomplished using heat, adhesive, or any other known methods, using adhesive or thermal laminators. Additional layers of filter media, scrim, or other layers can be incorporated into the filter constructions of the invention. The scope of the invention is not particularly limited as to the number of additional layers or the materials that make up the layers. One of skill will appreciate that virtually any construction that can be envisioned wherein a fine fiber fluorocarbon layer may be incorporated can be useful in various filtration applications.

In fuel filter applications, a positive flow of fuel is passed through a filter comprising at least a fluoropolymer fine fiber layer and at least one substrate layer. The fluorocarbon fine fiber layer separates both coarse water phase as well as emulsified water phase from different types of fuel. The total fuel throughput through the filter can be from about 0.04 liters per minute (L/min) to 1.5 L/min. In some embodiments of the invention, this flow rate corresponds to about 1.67 L/min per square meter (L/min/m$^2$) to 62.50 L/min/m$^2$ of fluorocarbon fine fiber. In some embodiments, the flow rate also corresponds to about 0.55 L/min per cubic centimeter (L/min/cm$^3$) to 21.00 L/min/cm$^3$ of bulk volume of the fluorocarbon fine fiber. As used herein, the term "bulk volume" means the volume of the fine fiber layer not excluding the interfiber spaces. Using filter constructions with the appropriate amount of fluoropolymer fine fiber, fuel having up to about 3% by weight (30,000 parts per million) of water entrained either as a coarse separate phase or as an emulsion can be treated to remove a substantial portion of the water. After filtration, the water is preferably drained away from the filter and into a vessel for water collection, such as a water bowl or some other receptacle attached to or situated underneath the bottom of the filter.

In order to reach the necessary fuel flow through the filter and concomitant rate of water removal, the fine fiber layers of the invention should be about 1 to 30 microns total thickness, more preferably about 1 to 20 microns total thickness, when the fine fiber layer is viewed at an angle 90° from the angle of fiber deposition. In other embodiments it is preferable to provide about 2 to 5 microns total thickness of the fluorocarbon fine fiber layer. In still other embodiments it is preferable to provide total thickness of the fluorocarbon fine fiber layer of less than 1 micron. The fine fluorocarbon fibers of the invention are preferably about 0.3 micron to 10 microns in diameter, more preferably about 0.5 to 5 microns in diameter. The basis weight of the fluorocarbon layer is about 0.01 to 10 g/m$^2$, more preferably about 0.1 to 2 g/m2. The air permeability of the fluoropolymer layer is about 0.1 to 5.0 m$^3$/min/m$^2$, more preferably about 0.1 to 1.0 m$^3$/min/m$^2$, even more preferably about 0.2 to 0.5 m$^3$/min/m$^2$. Other fluorocarbon configurations are possible and may work for various applications. For example, a very thick layer of fine fluorocarbon fiber can be deposited on a substrate. The fibers can be deposited more densely so as to result in less porosity, less permeability, lower or higher basis weight, and the like. The above numbers are not to be construed as limiting regarding the possible fluorocarbon fine fiber configuration; rather, the ranges preferred reflect the preferred ranges for the purpose of providing a single fine fiber layer on top of a filter substrate for the purpose of fuel filtration.

Porous hydrophobic materials are expected to work as efficient interfaces in the separation of water from fuel mixtures. Wang et al. U.S. Pat. No. 6,811,696 describe the fabrication of liquid filtration membranes from cast solutions of THV 220A in a variety of solvents. Microfiltration membranes produced by electrospinning methods have several advantages over cast membranes. Since the solvent in electrospinning does not come into contact with the substrate, there is complete freedom in choosing the substrate material on which the fine fibers are deposited. In addition, the lower membrane thickness achievable with electrospinning directly translates in enhancement of the membrane flux. Our own experiments have shown that the fine fiber webs of the invention can separate water from fuel mixtures.

We have observed that the fine fiber fluoropolymer webs of the invention can exhibit surprisingly high water repellency. Contact angles greater than 120°, and as high as 140° have been observed when measuring the contact angle of water on the fine fiber surfaces of the invention. Without being limited as to the theory of such high apparent water repellency, it appears that the intrinsic hydrophobic properties of fluoropolymers are augmented by the effect of the micron and submicron surface topology of the fine fiber web surface. By increasing the surface area of contact, the hydrophobic nature of the fluoropolymers can be effectively enhanced. For example, Acatay et al. have prepared fibers of polyacrylonitrile-co-α,α-dimethyl meta-isopropenylbenzyl with a perfluorinated diol (fluorolink-D) from solutions in DMF. Acatay, K. et al., *Angew. Chem. Int. Ed.* 2004, 43, 5210. These authors also observed that the apparent effect of the fluorinated surface and the fiber topology produce a hydrophobic surfaces with contact angles also as high as 160°.

We have further discovered that crosslinking the fine fiber webs of the invention leads to enhanced performance at elevated temperatures. Despite the attractive properties of these fluoropolymeric fibers, their employment is limited to applications at temperatures below the material's melting point. However, there are a number of environments where structures containing these fibers could be of utility, but which common temperatures are higher than that of the melting point of the fibers. The dimensional stability of these fibers could be improved beyond the material's melting point via crosslinking.

Crosslinking is a common strategy employed in improving the dimensional stability of polymeric materials liable to the effects of high temperatures and/or the attack of solvents. Crosslinking can be covalent, ionic, coordinating, or even mechanical in nature, and it can be achieved through variety of methods. The necessary energy for covalent crosslinking reactions initiation and propagation can be supplied via thermal or radiation methods, e.g. ultraviolet (UV), electron beam (EB), or γ-radiation.

Because of the chemical inertness of fluoropolymers, high energy methods such electron beam (EB) tend to be more successful at imparting crosslinking. EB methods have several advantages over some of the methods mentioned above. The heat generation during electron beam bombardment is minimal. Therefore, unlike thermal methods, the process can be utilized with wide range of heat sensitive materials.

EB methods have the occasional drawback of causing degradation of certain materials, however, they have been successfully employed in vinylidene fluoride containing polymers, and thus is suited for the polymer materials under consideration. See, e.g. Lyons, B. J. in *Modern Fluoropolymers*, Scheirs; J. Ed.; Wiley & Sons: New York, 1997, p. 335. It is interesting to note that in the case of PTFE, the method is destructive, as chain scission events predominate over crosslinking. Thus, where EB crosslinking is employed, it is advantageous to provide a fluorocarbon fine fiber layer wherein the fluoropolymer is not made up in part from TFE.

Another advantage of EB methods is the fast curing speeds at which they can operate, with concomitant productivity benefits. In addition, the depth of penetration of electronic radiation is far larger than the typical fine fiber structure, and can induce interfiber crosslinking, resulting in improved interfiber bonding as well as bonding and between the fibers and the substrate.

From the composition of Acatay and coworkers, it can be inferred that they intended to impart crosslinking to the fibers by using a catalyst to cause a chemical crosslinking reaction (i.e. not with EB or some other radiation type crosslinking). Acatay, K. et al., *Angew. Chem. Int. Ed.* 2004, 43, 5210. However, the authors do not report on the stability of these fibers in the presence of the catalyst. Moreover, the addition of the catalyst to the spinning solution in their case can limit the shelf life dramatically, introducing inconsistency to the process and jeopardizing recycling. The catalyst could also have undesirable effects when exposed to fossil fuel and could even leach catalyst into a fuel line with deleterious effects if used in a fuel filter application. The simplicity of initially inert polymers in solution combined with e-beam curing after fiber formation circumvents these problems.

In fuel filter applications, it is desirable to expose the fluoropolymer fine fiber webs of the invention to an EB at least at 400 KGy and 90 Kvolts, more preferably at least about 1000 KGy and 90 Kvolts.

The fine fibers and filter applications of the invention are further described in the Experimental Section below.

EXPERIMENTAL SECTION

Example 1

A polymer solution was obtained by combining polymer and solvent in a 500 ml glass kettle with a 3-neck lid, to which mechanical stirring, a temperature probe, and a condenser were attached. The vessel was placed in a heating mantle and the temperature controlled at 45° C. under constant agitation until a uniform solution was obtained. The solution was cooled to room temperature before electrospinning.

The solution composition was 9 wt % Dyneon™ THV 220A (from Dyneon LLC of Oakdale, Minn.), in acetone. After the solution had reached room temperature, sodium iodide was added to a final concentration of 0.05% of the solids, with continuous agitation until the salt had completely dissolved.

The solution was electrospun onto a silicone impregnated cellulose substrate (available as FF6168 from Hollingworth & Vose Company of East Walpole, Mass.) via a syringe, whereby flow was controlled through a syringe pump at 0.05 ml/min. The distance between the emitter (needle) and the substrate was fixed at 4 inches. The applied voltage was 25 Kvolts. The thickness of the resulting fine fiber mat was 3 μm, with an average fiber diameter of 0.3 μm.

Figure 2:
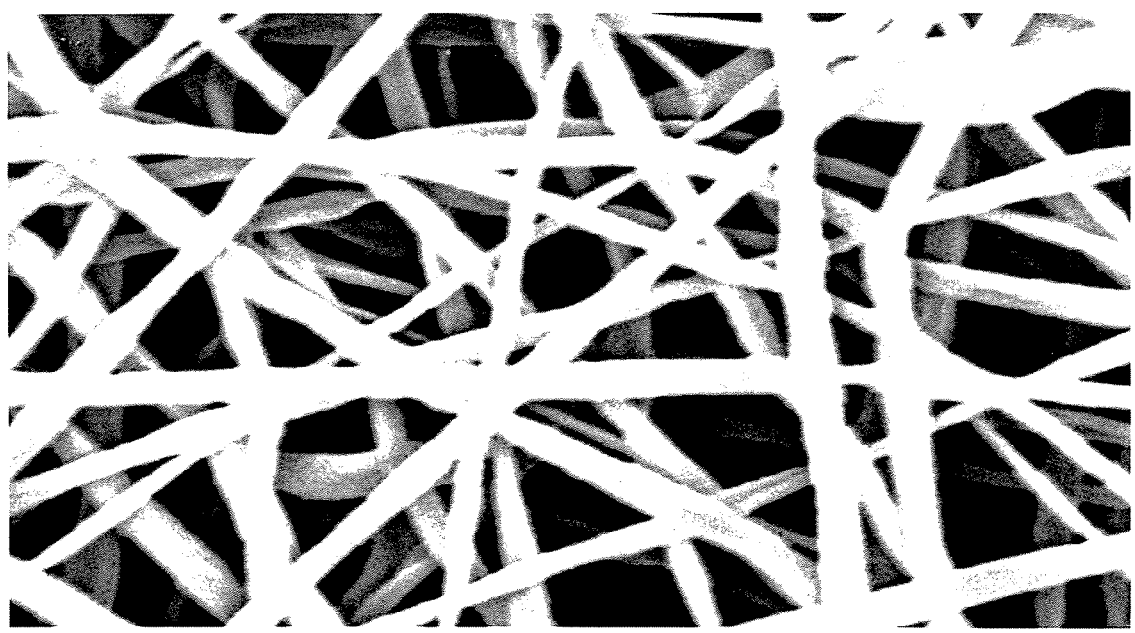
FIG. 2 is a higher magnification SEM micrograph of the embodiment of FIG. 1.

FIGS. 1 and 2 show photo micrographs of the fibers produced under these conditions. FIG. 1 is cross-section SEM micrograph of fine fiber mat produced as in Example 1, taken at 5000× magnification. FIG. 2 is a 15,000× magnification, high contrast SEM micrograph of fine fibers produced as in Example 1. The discrete fine fiber structure of the invention is visible in these micrographs.

Example 2

A polymer solution was prepared as in Example 1 by combining polymer and solvent in a container with constant agitation until a uniform solution was obtained.

Solution composition was 9 wt % solids total, wherein the solids were about 50/50 Solef® 26106/Solef 25108® (from Solvay S. A. of Brussels, Belgium), in acetone. After the solution had reached room temperature, sodium iodide was added to a final concentration of 0.05% of the solids, with continuous agitation until the salt had completely dissolved.

The solution was electrospun onto a silicone impregnated cellulose substrate (available as FF6168 from Hollingworth & Vose Company of East Walpole, Mass.) via a syringe, whereby flow was controlled through a syringe pump at 0.05 ml/min. The distance between the emitter and the substrate was fixed at 4 inches. The applied voltage was 25 Kvolts. The thickness of the resulting fine fiber mat was 3 µm, with an average fiber diameter of 0.3 µm.

Figure 3:
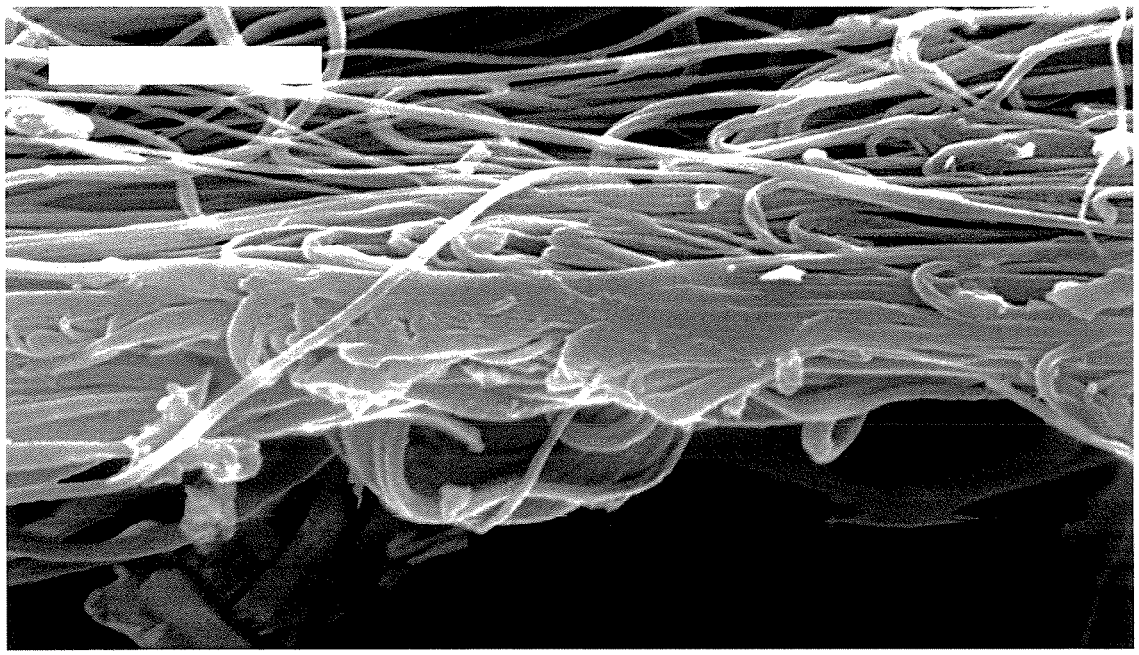
FIG. 3 is an SEM micrograph of an embodiment of the fine fibers of the invention.
Figure 4:
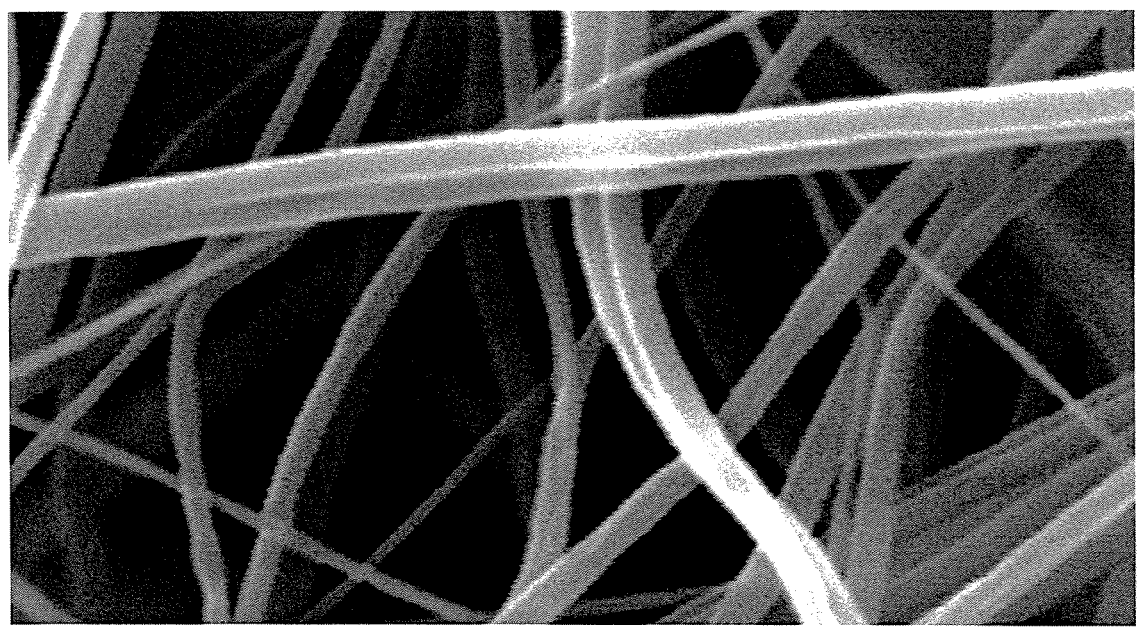
FIG. 4 is a higher magnification SEM micrograph of the embodiment of FIG. 3.

FIGS. 3 and 4 show photo micrographs of the fibers produced under these conditions. FIG. 3 is a cross section SEM micrograph of fine fiber mat produced as in Example 2, taken at 5000× magnification. FIG. 4 is a 10,000× magnification SEM micrograph of fine fibers produced as in Example 2. The discrete fine fiber structure of the invention is visible in these micrographs.

Example 3

A polymer solution was obtained using the technique employed in Example 1 by combining polymer and solvent in a container with constant agitation until a uniform solution was obtained. The materials used, solution composition, and electrospinning conditions were identical to those of Example 2.

Figure 5:
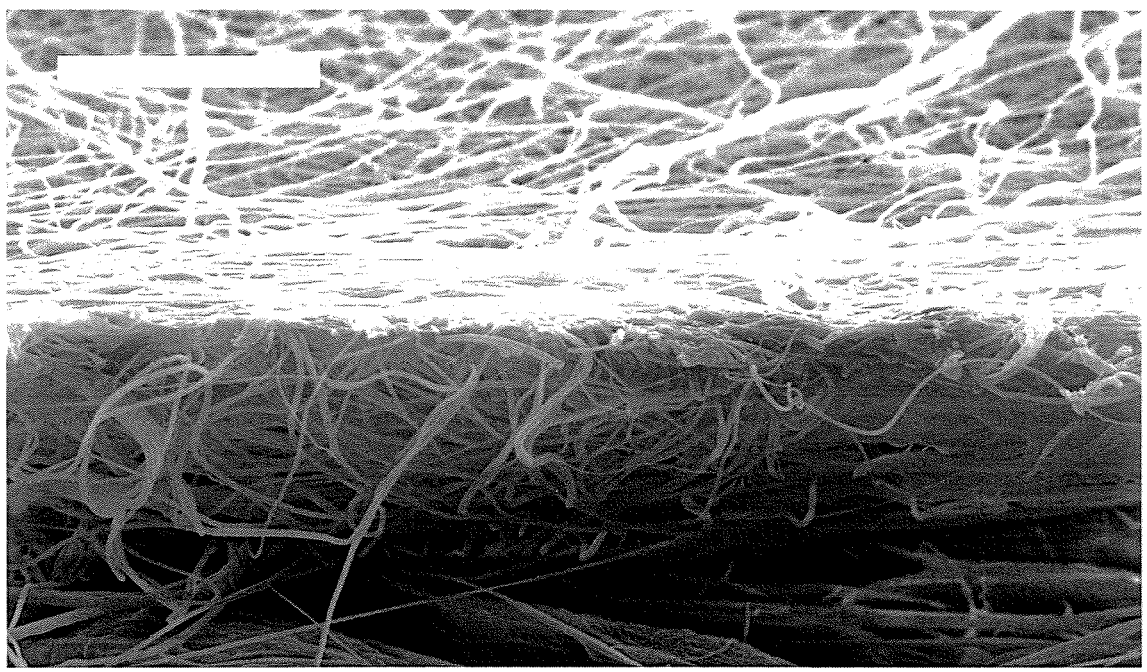
FIG. 5 is an SEM micrograph of an embodiment of the fine fibers of the invention.
Figure 6:
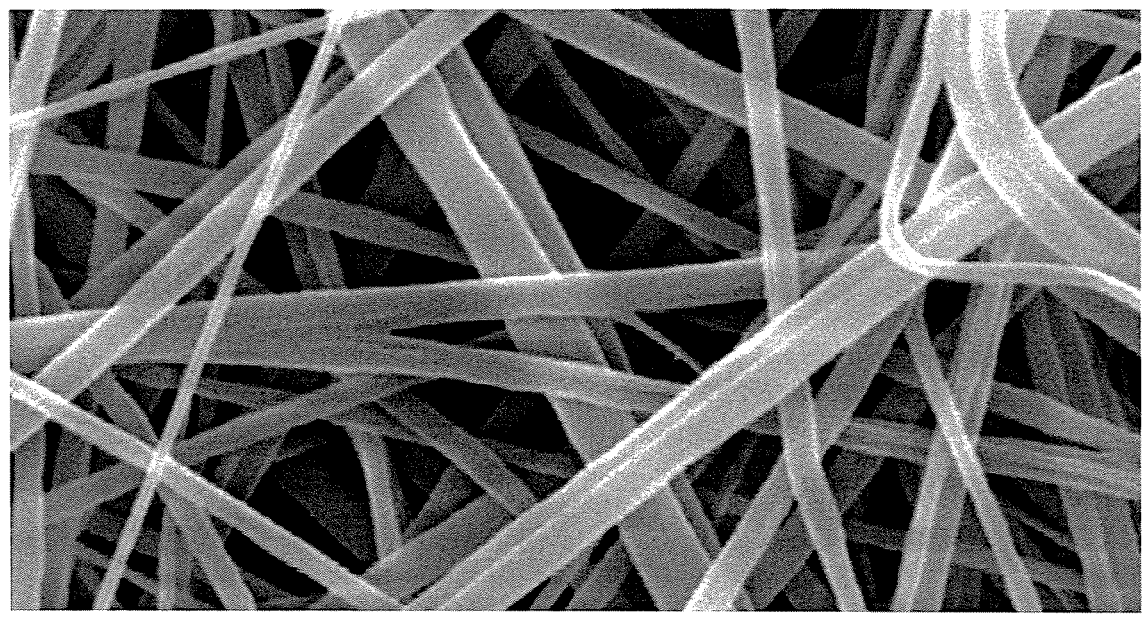
FIG. 6 is a higher magnification SEM micrograph of the embodiment of FIG. 5.

Longer fiber deposition time at the same rate as used in Example 2 resulted in a fine fiber mat with 30 µm thickness, with an average fiber diameter of 0.3 µm. FIGS. 5 and 6 show photo micrographs of the fibers produced under these conditions. FIG. 5 shows a 1000× cross section SEM micrograph of the fine fiber mat produced in Example 3. FIG. 6 shows a 10,000× magnification SEM micrograph of fine fibers produced as in Example 3. The discrete fine fiber structure of the invention is visible in these micrographs.

Example 4

A polymer solution was obtained as in Example 1 by combining polymer and solvent in a container with constant agitation until a uniform solution was obtained.

Solution composition was 30 wt % Kynar® SL (from Arkema Inc. of Philadelphia, Pa.), in acetone. The solution was electrospun onto an aluminum foil substrate via a syringe, whereby flow was controlled through a syringe pump at 1.0 ml/min. The distance between the tip of the spinneret (needle) and the substrate was fixed at 7 inches. The applied voltage was 25 Kvolts. The fibers produced had an average fiber diameter of 10 µm.

Figure 7:
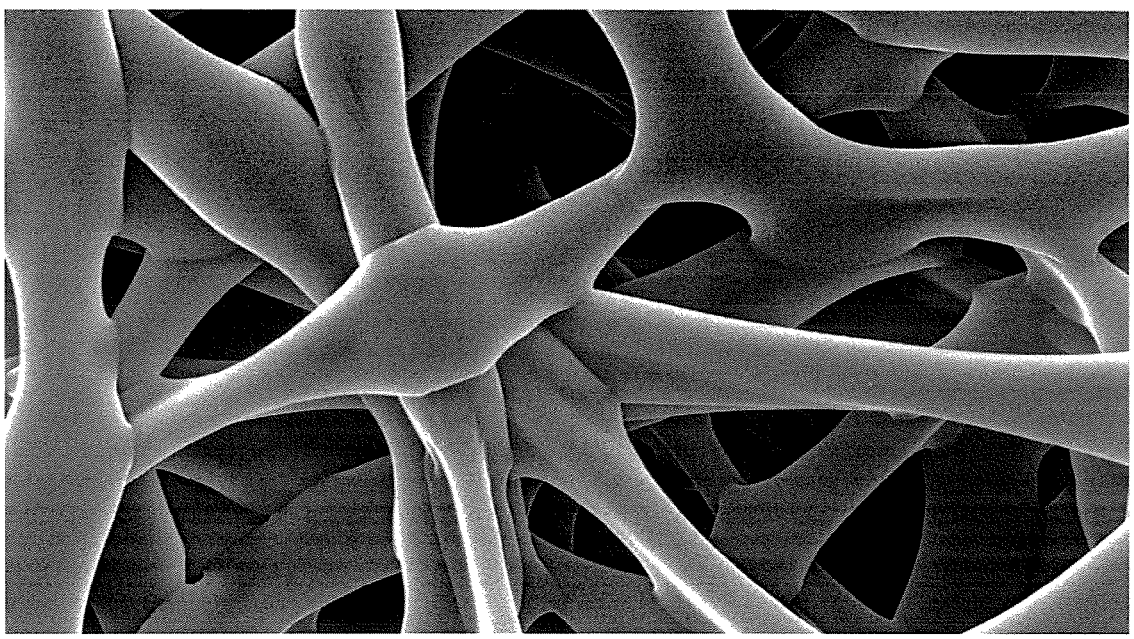
FIG. 7 is an SEM micrograph of an embodiment of the fine fibers of the invention.
Figure 8:
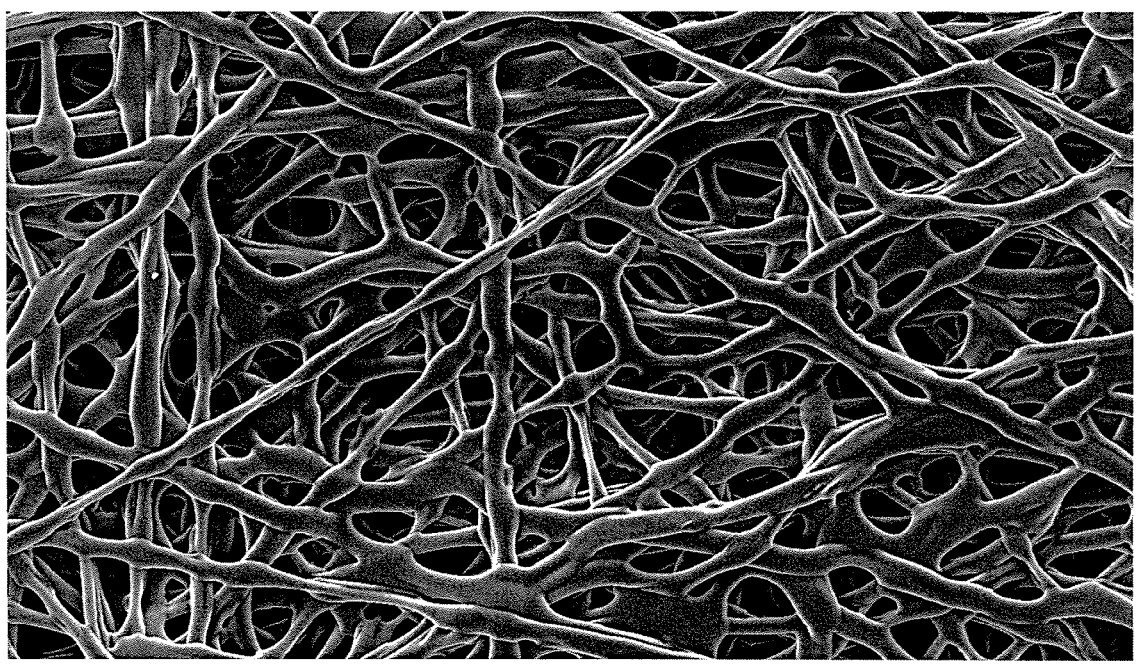
FIG. 8 is a higher magnification SEM micrograph of the embodiment of FIG. 7.

FIGS. 7 and 8 show photo micrographs of the fibers produced under these conditions. FIG. 7 is a 1000× magnification SEM micrograph of fine fibers produced as in Example 4. FIG. 8 is a 200× magnification SEM micrograph of fine fibers produced as in Example 4. The discrete fine fiber structure of the invention is visible in these micrographs.

Example 5

A polymer solution was obtained as in Example 1 by combining polymer and solvent in a container with constant agitation until a uniform solution was obtained.

Solution composition was 20 wt % Kynar® SL (from Arkema Inc. of Philadelphia, Pa.), in acetone. The solution was electrospun onto an aluminum foil substrate via a syringe, whereby flow was controlled through a syringe pump at 0.1 ml/min. The distance between the tip of the spinneret (needle) and the substrate was fixed at 4 inches. The applied voltage was 18 Kvolts. The fibers produced had an average fiber diameter of 1.2 µm.

Figure 9:
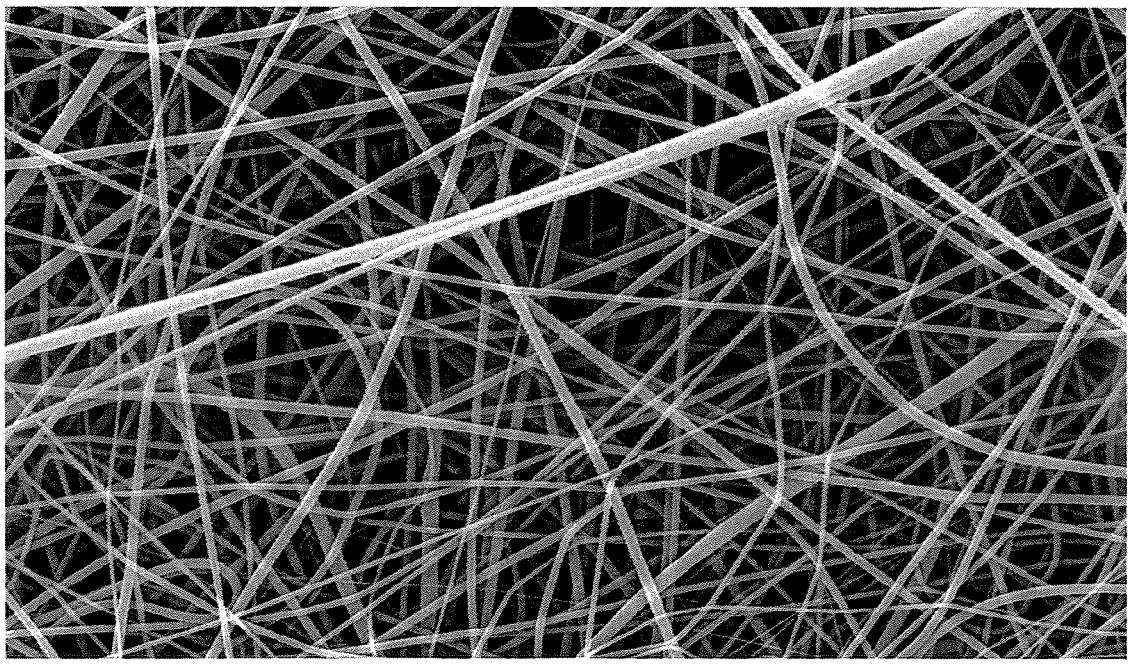
FIG. 9 is an SEM micrograph of an embodiment of the fine fibers of the invention.
Figure 10:
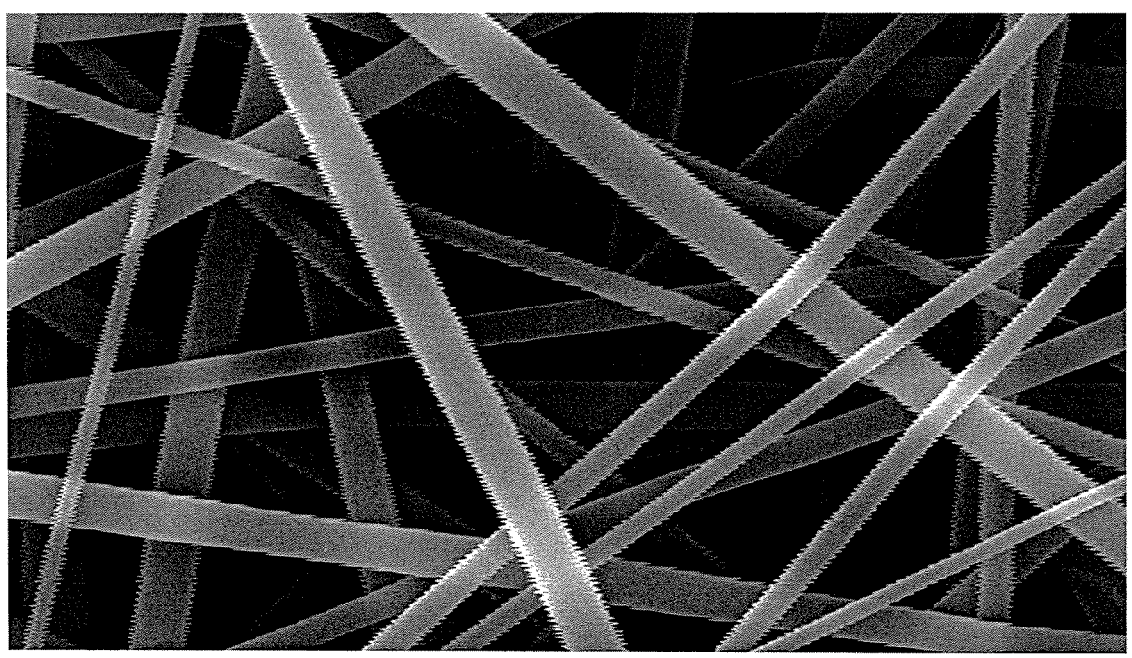
FIG. 10 is a higher magnification SEM micrograph of the embodiment of FIG. 9.

FIGS. 9 and 10 show photo micrographs of the fibers produced under these conditions. FIG. 9 is a 1000× magnification SEM micrograph of fine fibers produced as in Example 5. FIG. 10 is a 5000× magnification SEM micrograph of fine fibers produced as in Example 5. The discrete fine fiber structure of the invention is visible in these micrographs.

Example 6

A polymer solution was obtained as in Example 1 by combining polymer and solvent in a container with constant agitation until a uniform solution was obtained.

Solution composition was 10 wt % Solef® 21216 (from Solvay S. A. of Brussels, Belgium), in acetone. The solution was electrospun onto aluminum foil substrate via a syringe, whereby the flow was controlled through a syringe pump at 0.1 ml/min. The distance between the tip of the spinneret (needle) and the substrate was fixed at 4 inches. The applied voltage was 15 Kvolts. The fibers produced had an average fiber diameter of 0.4 µm.

Figure 11:
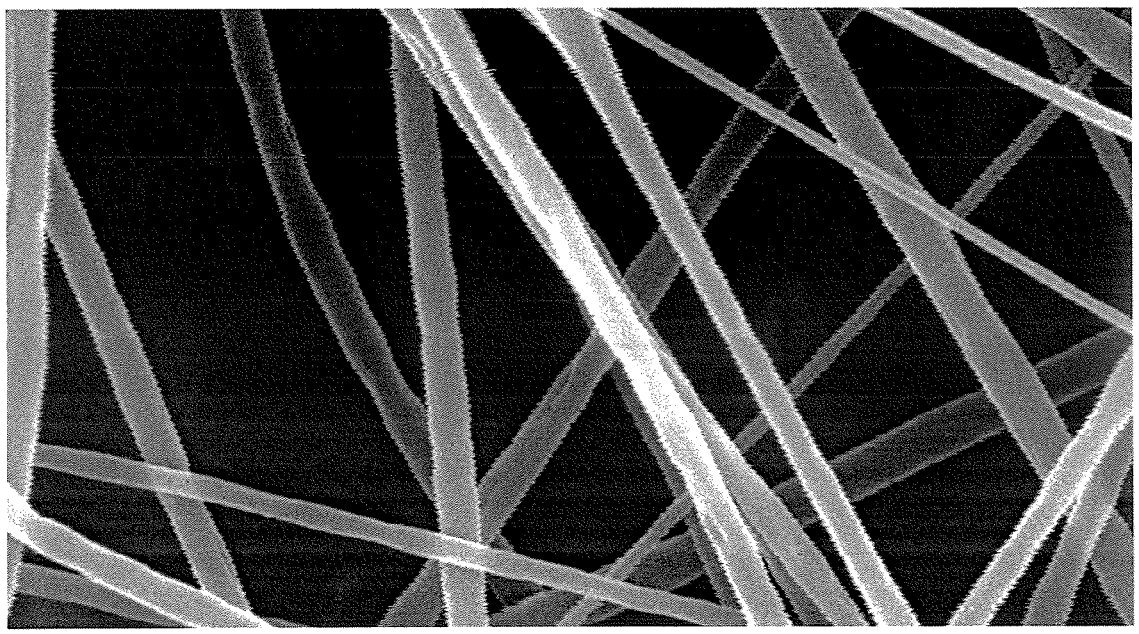
FIG. 11 is an SEM micrograph of an embodiment of the fine fibers of the invention.
Figure 12:
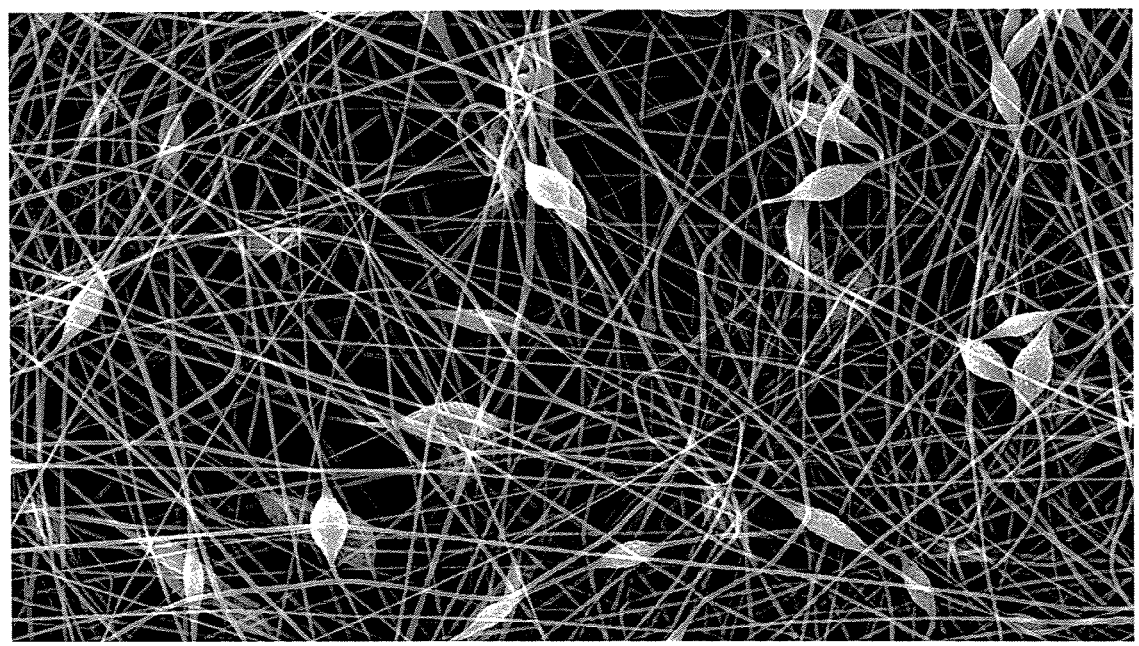
FIG. 12 is a lower magnification SEM micrograph of the embodiment of FIG. 11.

FIGS. 11 and 12 show photo micrographs of the fibers produced under these conditions. FIG. 11 is a 10,000× magnification SEM micrograph of fine fibers produced in Example 6. FIG. 12 is a 1000× magnification SEM micrograph of fine fibers produced in Example 6. The discrete fine fiber structure of the invention is visible in these micrographs.

Example 7

A polymer solution was obtained as in Example 1 by combining polymer and solvent in a container with constant agitation until a uniform solution was obtained.

Solution composition was 10 wt % Solef® 21216 (from Solvay S. A. of Brussels, Belgium), in acetone. The solution was electrospun onto an aluminum foil substrate via a syringe, whereby flow was controlled through a syringe pump at 0.05 ml/min. The distance between the tip of the spinneret (needle) and the substrate was fixed at 4 inches. The applied voltage was 9 Kvolts. The fibers produced had an average fiber diameter of 0.3 µm.

Figure 13:
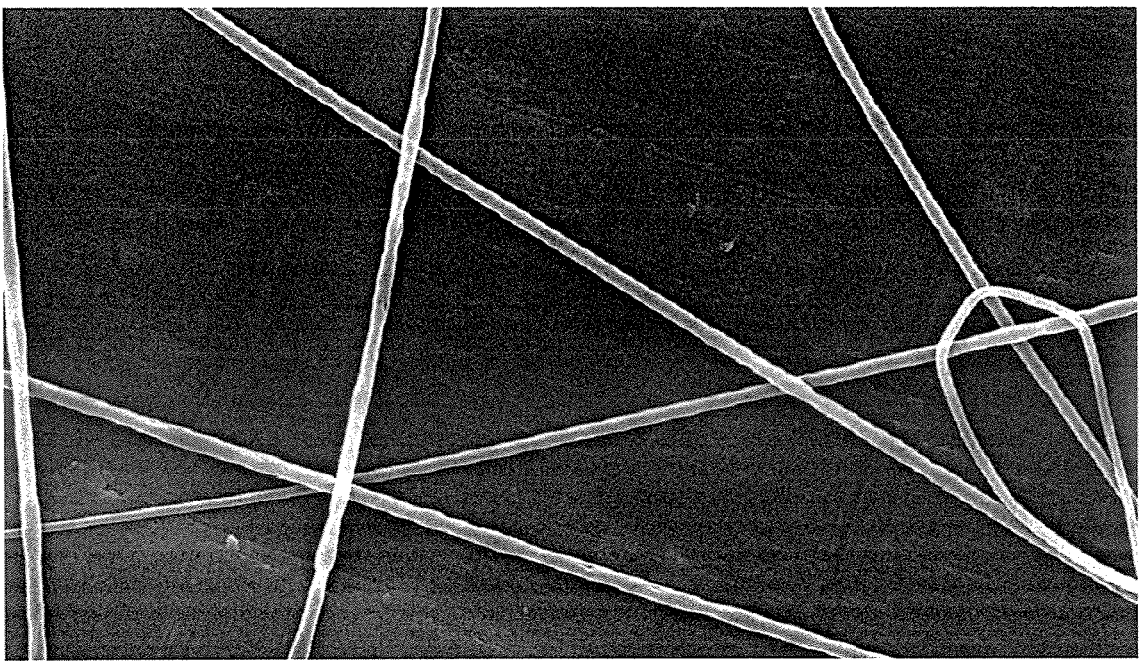
FIG. 13 is an SEM micrograph of an embodiment of the fine fibers of the invention.
Figure 14:
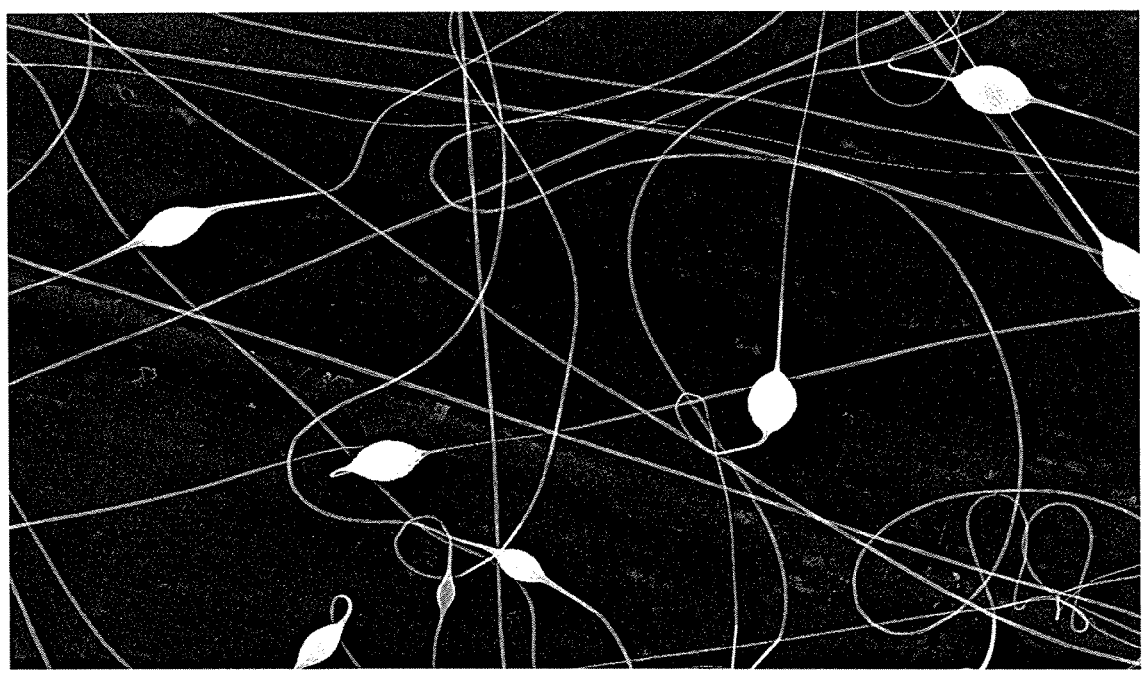
FIG. 14 is a lower magnification SEM micrograph of the embodiment of FIG. 13.

FIGS. 13 and 14 show photo micrographs of the fibers produced under these conditions. FIG. 13 is a 5,000× magnification SEM micrograph of fine fibers produced in Example 7. FIG. 14 is a 1,000× magnification SEM micrograph of fine fibers produced in Example 7. The discrete fine fiber structure of the invention is visible in these micrographs.

Example 8

A polymer solution was obtained as in Example 1 by combining polymer and solvent in a container with constant agitation until a uniform solution was obtained.

Solution composition was 15 wt % Solef® 21216 (from Solvay S. A. of Brussels, Belgium), in acetone. The solution was electrospun onto an aluminum foil substrate via a syringe, whereby flow was controlled through a syringe pump at 0.1 ml/min. The distance between the tip of the spinneret (needle) and the substrate was fixed at 6 inches. The applied voltage was 11 Kvolts. The fibers produced had an average fiber diameter of 1.2 µm.

Figure 15:
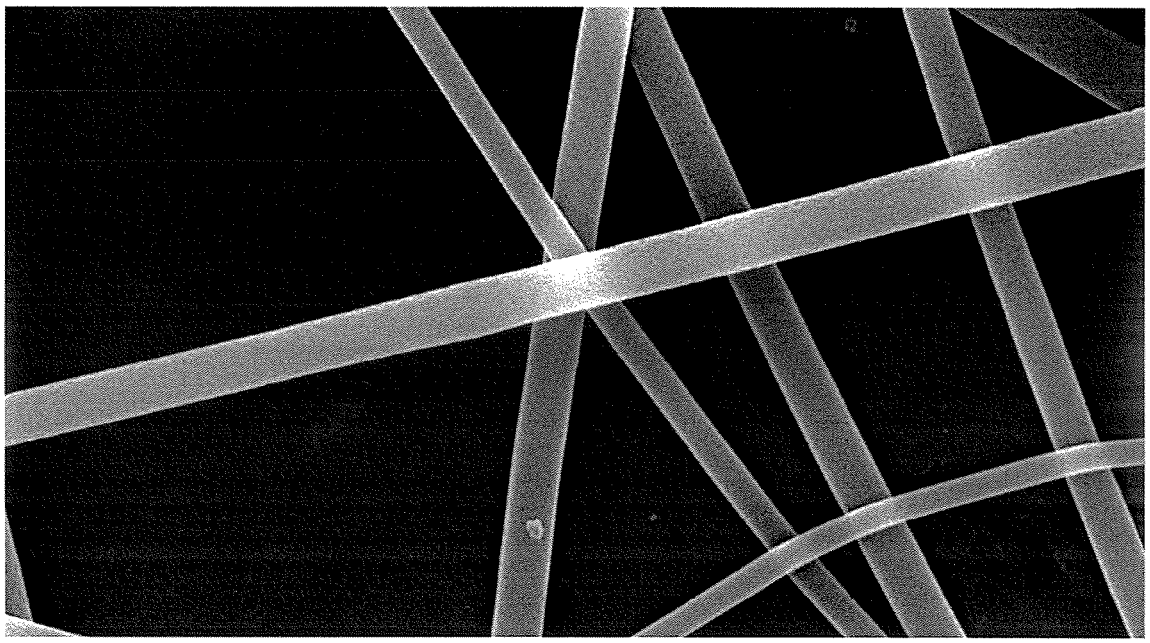
FIG. 15 is an SEM micrograph of an embodiment of the fine fibers of the invention.
Figure 16:
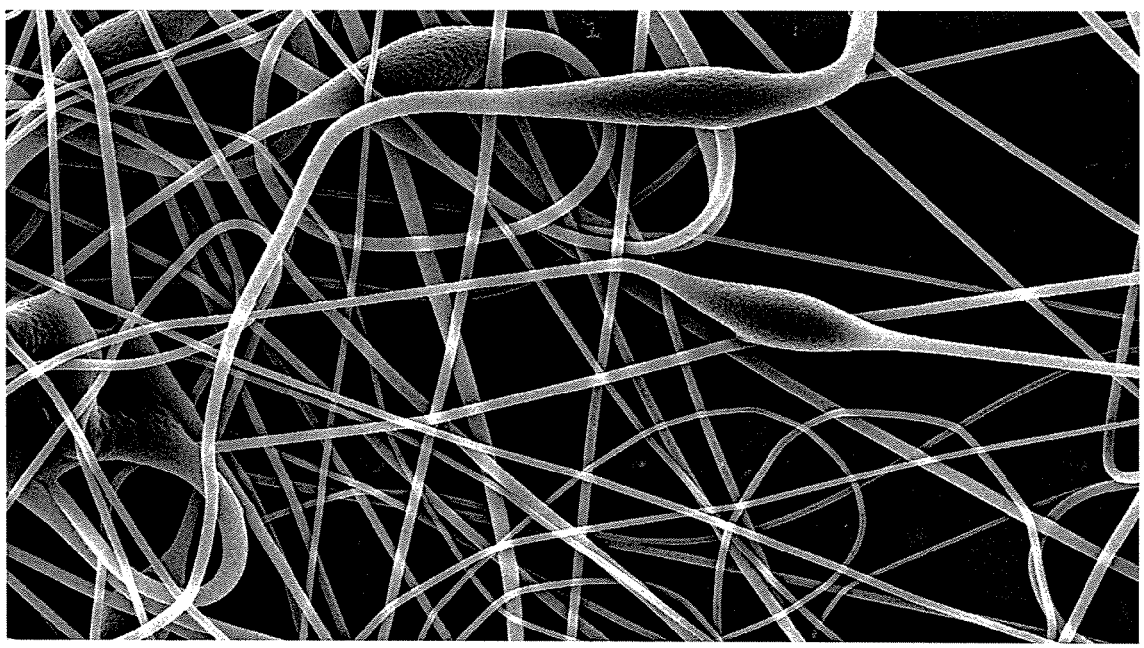
FIG. 16 is a lower magnification SEM micrograph of the embodiment of FIG. 15.

FIGS. 15 and 16 show photo micrographs of the fibers produced under these conditions. FIG. 15 is a 5,000× magnification SEM micrograph of fine fibers produced in Example 8. FIG. 16 is a 1,000× magnification SEM micrograph of fine fibers produced in Example 8. The discrete fine fiber structure of the invention is visible in these micrographs.

Example 9

A polymer solution was obtained as in Example 1 by combining polymer and solvent in a container with constant agitation until a uniform solution was obtained.

The solution composition is identical to that of Example 8. The solution was electrospun onto an aluminum foil substrate via a syringe, whereby flow was controlled through a syringe pump at 1.0 ml/min. The distance between the tip of the emitter and the substrate was fixed at 6 inches. The applied voltage was 18 Kvolts. The fibers produced have an average fiber diameter of 1.2 µm.

Figure 17:
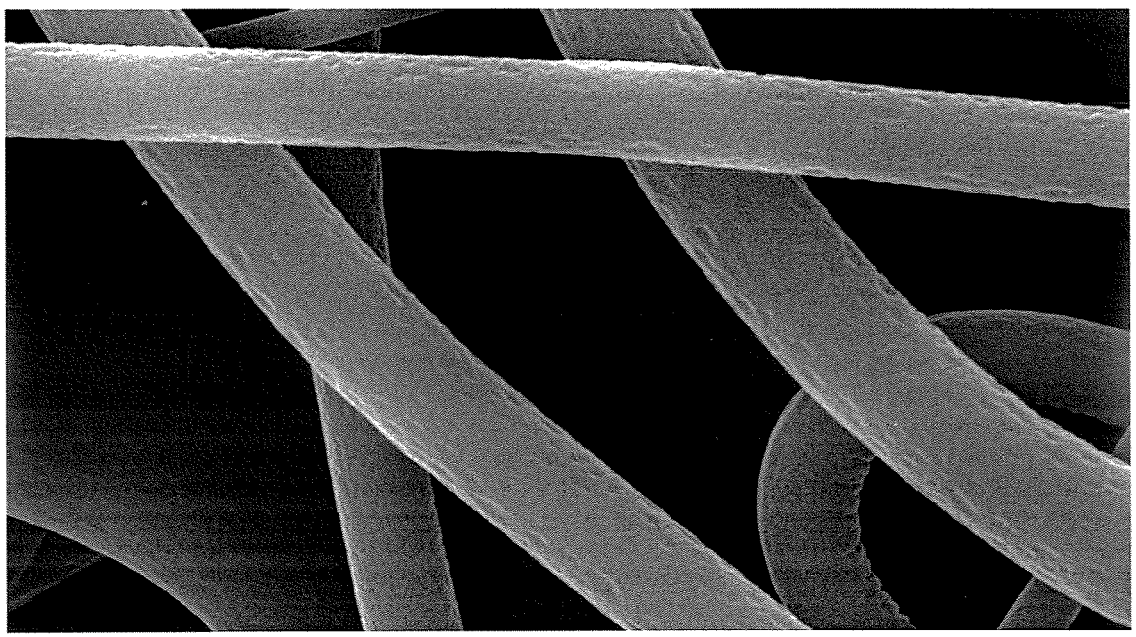
FIG. 17 is an SEM micrograph of an embodiment of the fine fibers of the invention.
Figure 18:
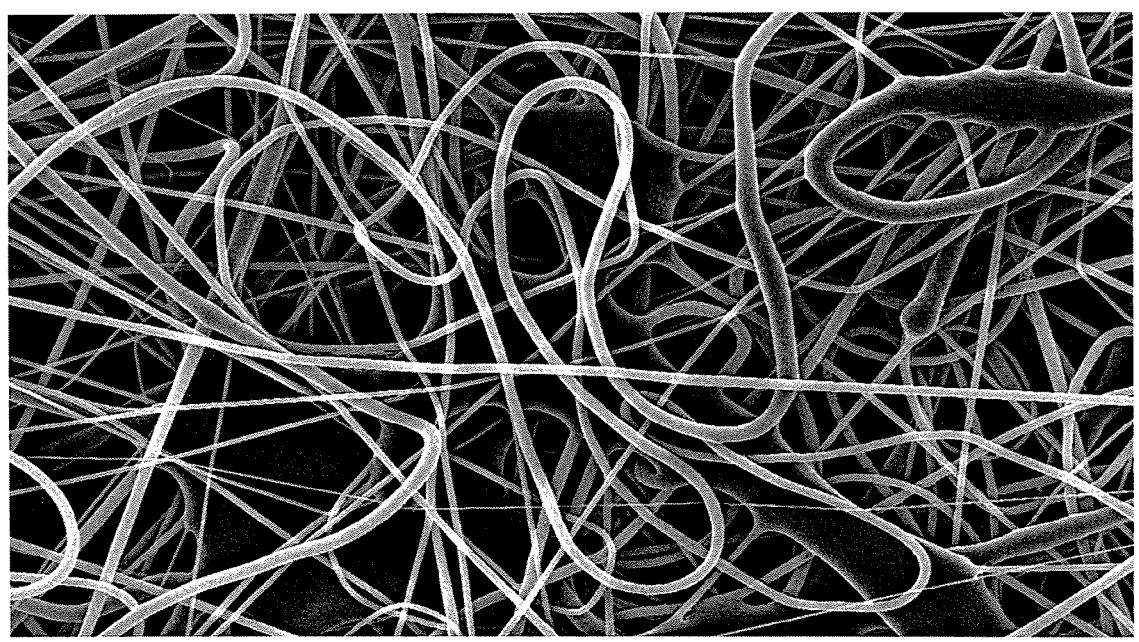
FIG. 18 is a lower magnification SEM micrograph of the embodiment of FIG. 17.

FIGS. 17 and 18 show photo micrographs of the fibers produced under these conditions. FIG. 17 shows a 5,000× magnification SEM micrograph of fine fibers produced as in Example 9. FIG. 18 shows a 500× magnification SEM micrograph of fine fibers produced as in Example 9. The discrete fine fiber structure of the invention is visible in these micrographs.

High Temperature Resistance

Electron Beam Curing

Example 10

A polymer solution was obtained as in Example 1 by combining polymer and solvent in a container with constant agitation until a uniform solution was obtained.

Solution composition was 10 wt % Dyneon™ THV A220 (from Dyneon LLC of Oakdale, Minn.), in 80/20 wt/wt of acetone/ethyl lactate. The solution was electrospun onto a silicone impregnated cellulose substrate (available as FF6168 from Hollingworth & Vose Company of East Walpole, Mass.) via a syringe, whereby flow was controlled through a syringe pump at 0.1 ml/min. The distance between the tip of the emitter and the substrate was fixed at 4 inches. The applied voltage was 18 Kvolts.

Figure 19:
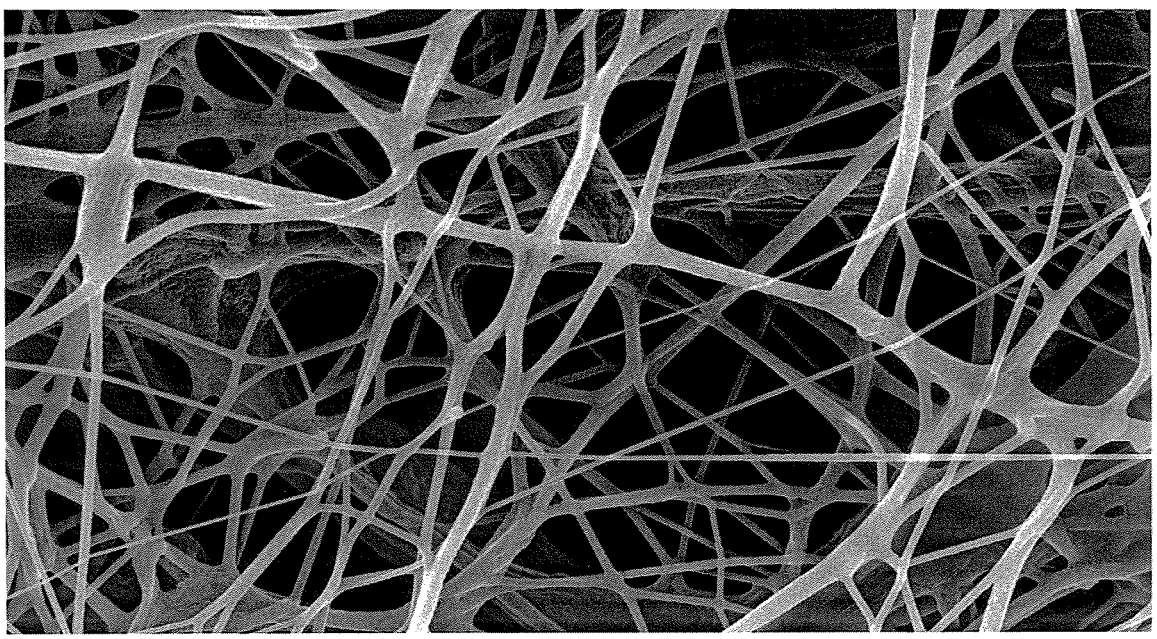
FIG. 19 is an SEM micrograph of an embodiment of the fine fibers of the invention.

FIG. 19 shows a 1000× SEM photo micrograph of the fibers produced under these conditions. FIG. 19 is a representative SEM micrograph of "as electrospun" fine fibers produced as in Example 10.

Figure 20:
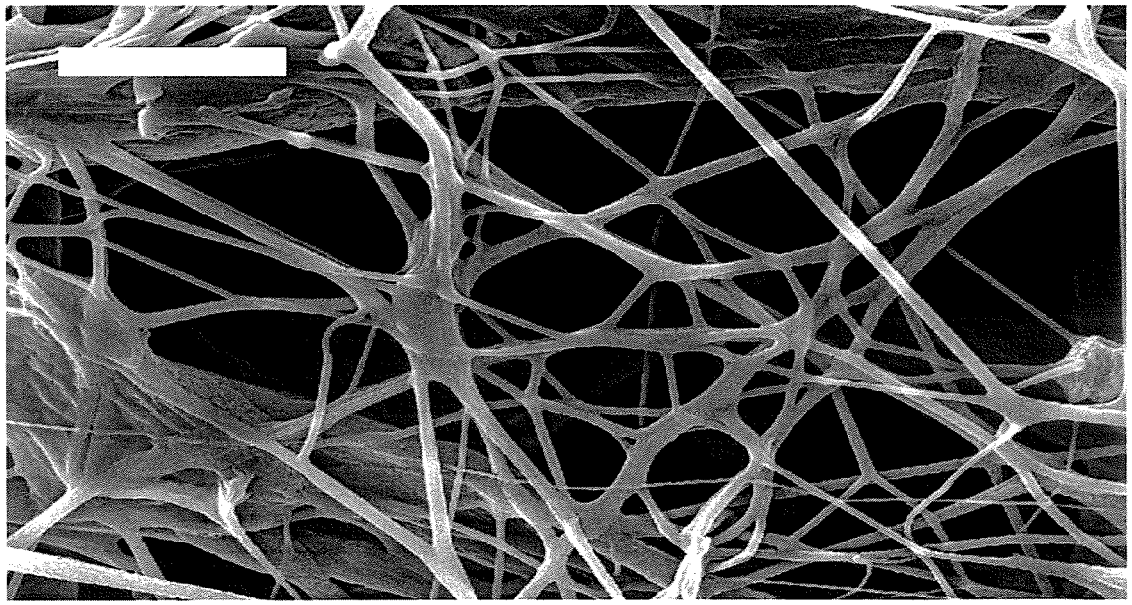
FIG. 20 is an SEM micrograph of the embodiment shown in FIG. 19, after electron beam treatment.
Figure 21:
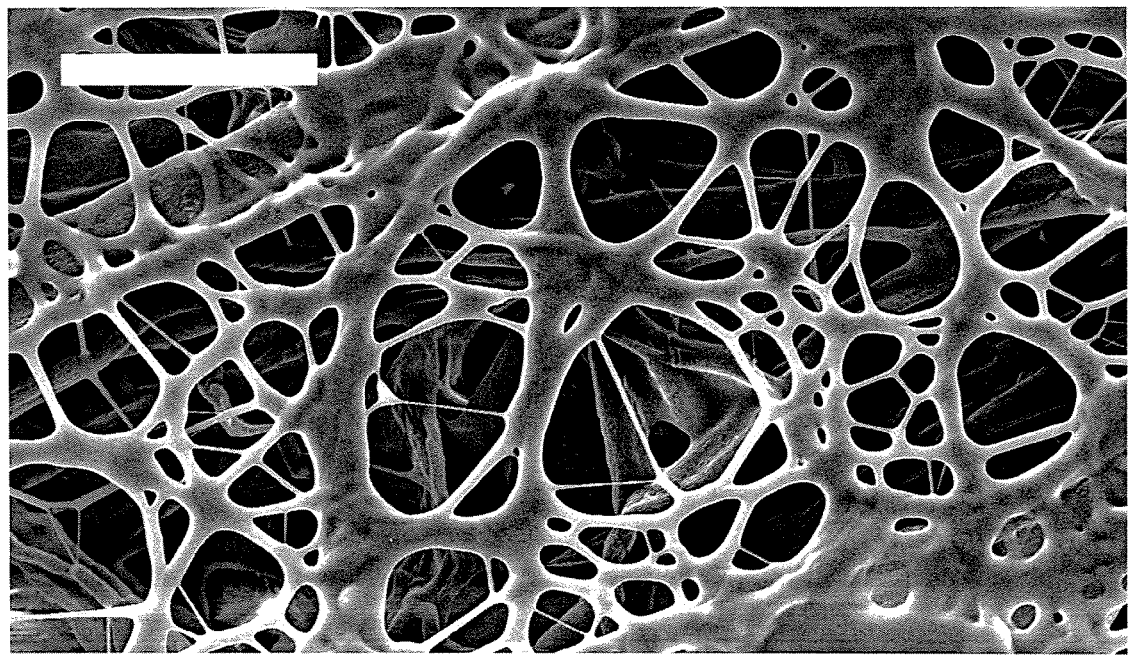
FIG. 21 is an SEM micrograph of the embodiment shown in FIG. 20, after heat treatment.

Samples of material produced as described above were subjected to electron radiation using a laboratory unit from Advanced Electron Beams, Inc. of Wilmington, Mass. The samples were treated at 100 KGy, and 90 Kvolts, under nitrogen blanket. FIG. 20 is a 1000× SEM micrograph showing the fibers after electron beam treatment. FIG. 20 is a representative SEM micrograph of electron beam treated fine fibers produced as in Example 10. After electron beam treatment the samples were exposed to 200° C. for 10 minutes. FIG. 21 is a 500×SEM micrograph showing the fiber mat after heat exposure. FIG. 21 is a representative SEM micrograph of electron beam treated fine fibers produced as in Example 10 and exposed to 200° C. for 10 minutes.

Example 11

Figure 22:
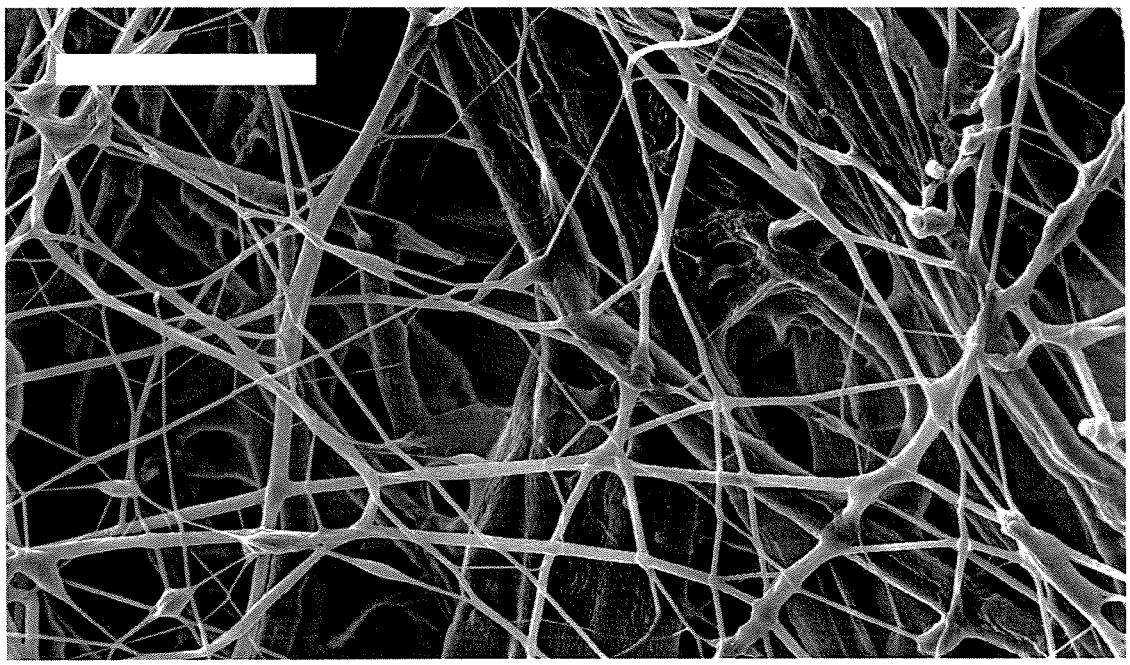
FIG. 22 is an SEM micrograph of an embodiment of the fine fibers of the invention after exposure to electron beam, then heat.

The electrospun fiber samples prepared in Example 10, prior to electron beam or heat treatment. The fibers were subjected to electron radiation using a laboratory unit from Advanced Electron Beams, Inc. of Wilmington, Mass. The samples were subjected to 500 KGy and 90 Kvolts under nitrogen blanket. After electron beam treatment the samples were exposed to 200° C. for 10 minutes. FIG. 22 shows the fiber mat after heat exposure at 500×. FIG. 22 is a representative SEM micrograph of electron beam treated fine fibers produced as in Example 10 and exposed to 200° C. for 10 minutes.

Example 12

Figure 23:
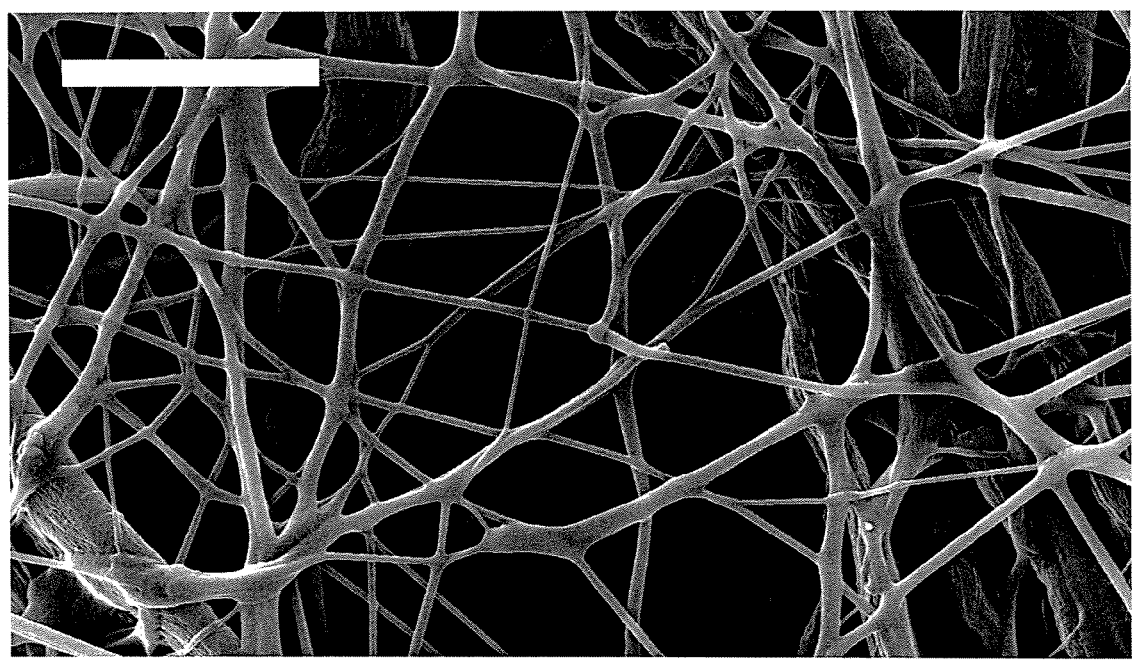
FIG. 23 is an SEM micrograph of an embodiment of the fine fibers of the invention after exposure to electron beam, then heat.

The samples prepared in Example 10, prior to electron beam treatment or heat treatment, were subjected to electron radiation using a laboratory unit from Advanced Electron Beams, Inc. of Wilmington, Mass. The samples were subjected to 1000 KGy and 90 Kvolts under nitrogen blanket. After electron beam treatment the samples were exposed to 200° C. for 10 minutes. FIG. 23 shows the fiber mat after heat exposure, at 1000×. FIG. 23 is a representative SEM micrograph of electron beam treated fine fibers produced as in Example 10 and exposed to 200° C. for 10 minutes. The discrete fine fiber structure of the invention is visible in the micrograph.

Comparative Example 13

Figure 24:
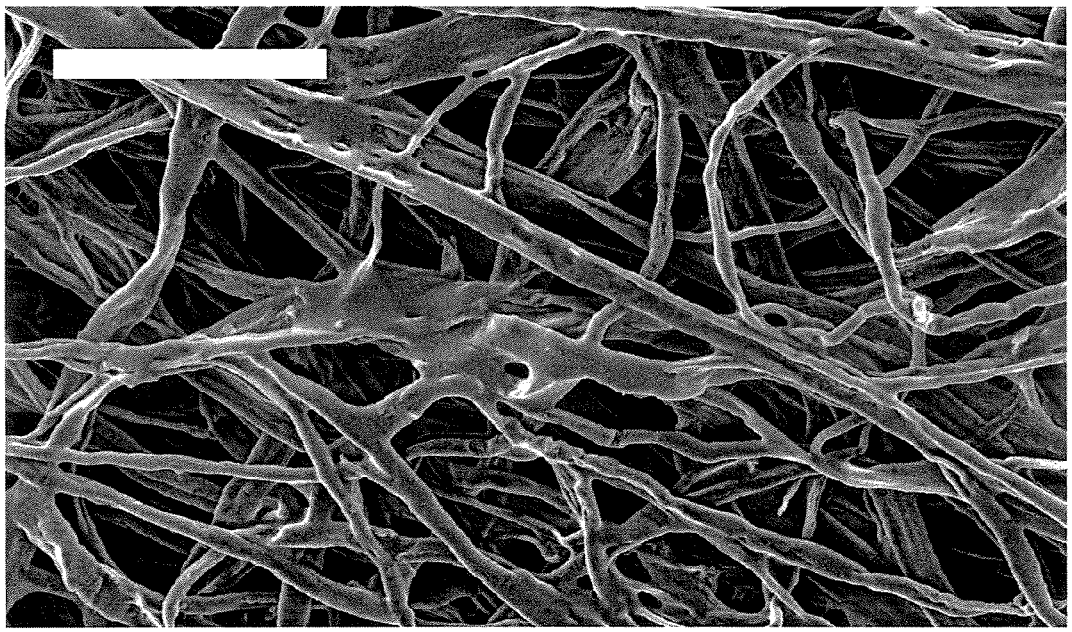
FIG. 24 is an SEM micrograph of an embodiment of the fine fibers of the invention after exposure to heat without exposure to electron beam.

Samples were prepared as in Example 10, but without electron beam treatment, were exposed to 200° C. for 10 minutes. FIG. 24 is a 200× micrograph of the fiber mat completely melted on the silicone impregnated cellulose substrate (available as FF6168 from Hollingworth & Vose Company of East Walpole, Mass.) after heat exposure. FIG. 24 is a representation of representative SEM sample produced as in Example 10 and exposed to 200° C. for 10 minutes without electron beam exposure. The melted and matted layer has substantially no fine fiber layer.

Example 14

Figure 25:
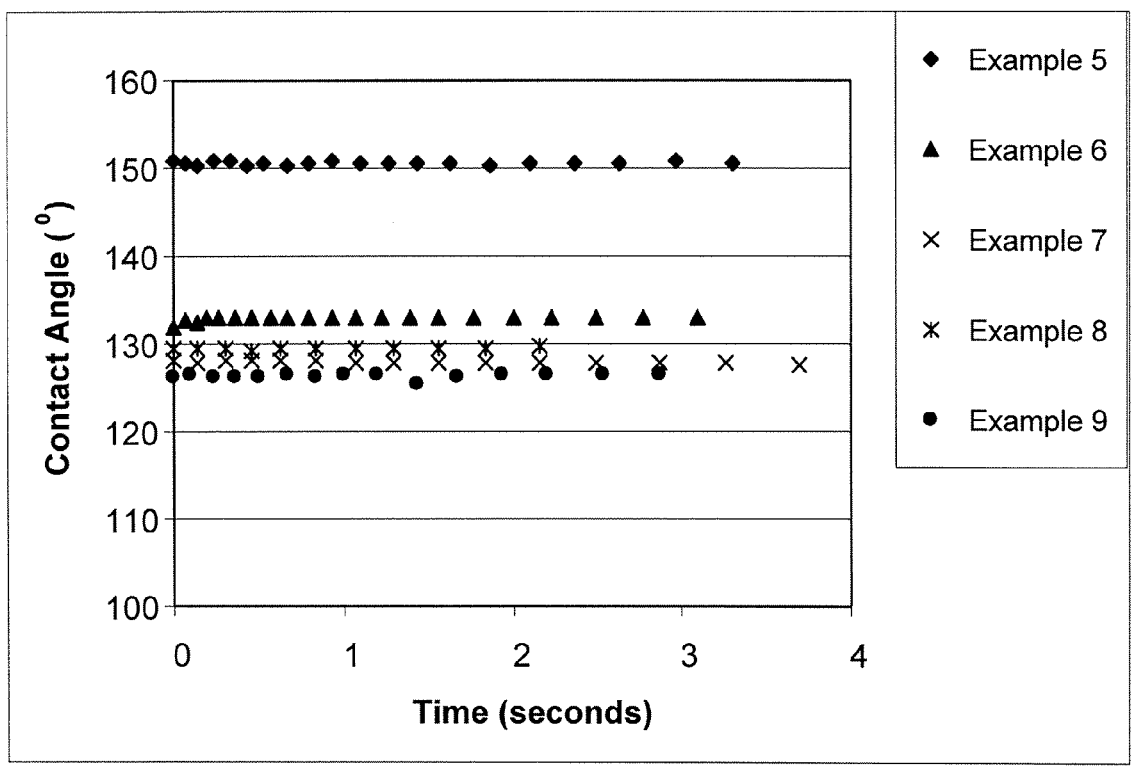
FIG. 25 shows the water dynamic contact angle of the fine fiber layers of Examples 5 to 10.

Dynamic contact angle measurements to water were employed in order to assess the relative hydrophobicity of the fiber matrices. Initial contact angle values, as well as values after the first few seconds can serve as qualitative measure of the matrices hydrophobicity and related wicking properties. The measurements were performed using the FTA 200 goniometer (available from First Ten Angstroms, Inc. of Portsmouth, Va.). The fine fiber layers of Examples 5-9 were measured. FIG. 25 shows the water dynamic contact angle for the fine fiber layers.

Air Filtration Performance

Example 15

The filter material made in Examples 1-3 was tested for Air Filtration Performance LEFS Efficiency. In each case, the fluorocarbon fine fiber was electrospun onto FF6168 from Hollingworth & Vose Company of East Walpole, Mass. A 4 inch diameter sample was cut from the media. Particle capture efficiency of the test specimen is calculated using 0.8 µm latex spheres as a test challenge contaminant in the LEFS bench operating at 20 FPM. Measurements of air flow were performed on a TEXTEST FX 3300 instrument operating at 125 Pa. The results of the test are shown in Table 1. All the Examples tested showed high efficiency with low pressure drop and good air flow.

TABLE 1

Air filtration performance of selected samples.

| Sample | LEFS Efficiency (%) | Pressure Drop (mm H$_2$O) | Air Flow (cfm at 125 Pa) |
|---|---|---|---|
| Substrate | 95.0 | 2.16 | 6.0 |
| Example 1 | 99.9 | 2.46 | 4.1 |
| Example 2 | 99.5 | 2.42 | 5.1 |
| Example 3 | 99.9 | 2.46 | 3.7 |

Liquid Filtration Performance

Water Fuel Separation

Example 16

Filtration efficiency testing was performed on the separation media prepared by electrospinning and sometimes further lamination process according to the following procedure. A flat sheet fuel/water bench was built in accordance with SAE J1488 including a flatsheet holder for testing 8×8 inch (about 20×20 millimeter) media samples. When mounted on the flatsheet holder, the effective test area tested is about 0.024 square meters. The samples tested were fine fiber fluoropolymer layers having a layer thickness of about 3 micron. Thus, the effective volume of fine fiber tested was about $7.25 \times 10^{-8}$ cubic meters, or about 0.0725 cubic centimeters. Ultralow sulfur diesel fuel was used as the test fuel. The ultralow sulfur fuel was purchased from Chevron-Phillips Chemical Company. It contains less than 15 parts per million sulfur. This fuel is highly saturated with fuel additives which makes the water-in-fuel emulsion much more stable than in other fuels, which is evidenced by the smaller water droplet size. The interfacial tension of this fuel against water is in the range of 7 to 13 dynes/cm. The test fuel temperature was held at a constant 26.7±2.0° C.

For each separation media tested, the sample was mounted vertically in place in the holder, the fuel pump was turned on, and the flow and test fuel temperature were allowed to stabilize. Emulsified water in the diesel test fuel was then generated by injecting distilled water into a stream of diesel fuel which in turn was subjected to a centrifugal pump upstream of the test media operating at 3500 rpm. This resulted in a concentration of emulsified water in the diesel fuel upstream of the separation membrane of about 2500±200 ppm. Water concentration was monitored both upstream and downstream of the separation membrane using a volumetric Karl-Fischer titrator. Fuel/water interfacial tension (in dynes/cm) was measured before and after each test with a semi-automatic tensiometer (Kruss Tensiometer K11, available from Kruss GmbH, of Hamburg, Germany) using a DuNuoy ring. Water concentration downstream of the separation membrane was measured every 10-20 minutes depending on the total test duration time, which was typically 120-150 minutes.

The time-weighted water filtration efficiency was calculated using the water concentration difference upstream and downstream of the medium. By way of example, if the downstream water concentration was on average only 5% of the upstream water concentration, then the efficiency was calculated to be 95%. Breakthrough time was also assessed for each separation membrane. Breakthrough time was defined as the time when the measured downstream water concentration exceeded 500 ppm, indicating low efficacy of the filter in separating water from fuel.

Each separation membrane was evaluated at a flow rate of 0.4 L/min, some test substrates were also evaluated at a flow rate of 0.8 L/min. The flow rate of 0.4 L/min corresponds to a rate of flow of fuel through the fine fiber layers having an area of 16.67 L/min/m$^2$, or a rate of flow through the fine fiber layers having a volume of 5.52 L/min/cm$^3$. The flow rate of 0.8 L/min corresponds to a rate of flow of the fuel through the fine fiber layers having an area of 33.33 L/min/m$^2$, or a rate of flow through the fine fiber layers having a bulk volume of 11.04 L/min/cm$^3$. As used herein, the term "bulk volume" means the volume of the filter layer without excluding the interfiber spaces. The results are shown in Table 2.

TABLE 2

Water/fuel separation performance of selected samples.

| Example | Flow rate (L/min) | Feed Water conc. (ppm) | TWA efficiency (%) | Test time (min) | Break-Through time (min) | Initial ΔP (psi) | Terminal ΔP (psi) |
|---|---|---|---|---|---|---|---|
| Substrate only | 0.4 | 2500 | 39.4 | 150 | 15 | 0.1 | 0.2 |
| Substrate only | 0.8 | 2500 | 33.8 | 75 | 5 | 0.4 | 0.6 |
| 1 | 0.4 | 2500 | 100 | 150 | None | 0.1 | 0.1-0.2 |
| 1 | 0.8 | 2500 | 88.2 | 120 | 65-120 | 0.3 | 0.6 |
| 2 | 0.4 | 2500 | 100 | 150 | None | 0.1 | 0.1 |
| 2 | 0.8 | 2500 | 88.5 | 120 | 55 | 0.2 | 0.3 |
| 3 | 0.4 | 2500 | 100 | 150 | None | 0.1 | 0.1 |
| 3 | 0.8 | 2500 | 87.3 | 120 | 15 | 0.3 | 0.7 |

The above specification, examples and data provide a complete description of the manufacture and use of the composition of the invention. Since many embodiments of the invention can be made without departing from the spirit and scope of the invention, the invention resides in the claims hereinafter appended.

We claim:

1. A fine fiber layer comprising a fine fiber, the fine fiber comprising a fluoropolymer comprising;
    a polymer comprising tetrafluoroethylene and hexafluoropropylene;
    a polymer comprising tetrafluoroethylene and a perfluorovinyl ether;
    a polymer comprising hexafluoropropylene, tetrafluoroethylene, and ethylene;
    a polymer comprising vinylidene fluoride, trifluoroethylene, and tetrafluoroethylene; or
    a polymer comprising a fluorinated acrylic monomer, wherein the fluorinated acrylic monomer is a fluorinated acrylate or methacrylate;

the fine fiber comprising a fine fiber diameter of about 0.1 microns to 0.5 microns, the fine fiber layer comprising a thickness of about 0.2 microns to about 30 microns and a basis weight of about 0.01 grams per square meter to less than 10 grams per square meter.

2. The fine fiber layer of claim 1 wherein the fine fiber diameter is about 0.3 microns to 0.5 microns.

3. The fine fiber layer of claim 1 wherein the fine fiber layer has an interfiber spacing of about 0.01 micron to 25 microns.

4. The fine fiber layer of claim 1 wherein the fine fiber layer has an interfiber spacing of about 0.1 micron to 10 microns.

5. The fine fiber layer of claim 1 wherein the fine fiber layer has permeability to air of about 0.1 $m^3/min/m^2$ to 5.0 $m^3/min/m^2$.

6. The fine fiber layer of claim 1 wherein the fine fiber layer has permeability to air of about 0.1 $m^3/min/m^2$ to 1.0 $m^3/min/m^2$.

7. The fine fiber layer of claim 1 wherein the fine fiber layer has permeability to air of about 0.2 $m^3/min/m^2$ to 0.5 $m^3/min/m^2$.

8. The fine fiber layer of claim 1 wherein the fine fiber layer has a contact angle to water of at least 90°.

9. The fine fiber layer of claim 1 wherein the fine fiber layer has a contact angle to water of at least 120°.

10. The fine fiber layer of claim 1 wherein the fine fiber layer has a contact angle to water of at least 130°.

11. The fine fiber layer of claim 1 wherein the fine fiber layer comprises a substrate.

12. The fine fiber layer of claim 11 wherein the substrate comprises a woven substrate.

13. The fine fiber layer of claim 11 wherein the substrate comprises a non-woven substrate.

14. The fine fiber layer of claim 11 wherein the substrate comprises a prefilter, a filter layer, a woven cellulose backing, a synthetic polymer backing, a scrim, a fuel filter substrate, a high efficiency particulate air filter, or a combination thereof.

15. The fine fiber layer of claim 11 wherein the substrate comprises a nonwoven cellulose.

16. The fine fiber layer of claim 15 wherein the substrate comprises silicone.

17. The fine fiber layer of claim 1 wherein the fine fiber layer is disposed between at least two substrate layers.

18. The fine fiber layer of claim 17 wherein at least one of the at least two substrate layers comprises a scrim.

19. The fine fiber layer of claim 18 wherein the scrim comprises a polyester or a nylon.

20. The fine fiber layer of claim 18 wherein the scrim has a basis weight of about 15 $g/m^2$ to 75 $g/m^2$.

21. The fine fiber layer of claim 17 wherein at least one of the at least two substrate layers comprises a prefilter, a filter layer, a woven cellulose backing, a synthetic polymer backing, a fuel filter substrate, a high efficiency particulate air filter, or a combination thereof.

22. The fine fiber layer of claim 17 wherein at least one of the at least two substrate layers comprises cellulose, a glass fiber, a polyester, a resin saturated polyester, a nylon, or a blend of copolymer thereof.

23. The fine fiber of claim 22 wherein at least one of the at least two substrate layers is a nonwoven.

24. The fine fiber layer of claim 23 wherein the nonwoven is a meltblown nonwoven.

25. The fine fiber layer of claim 21 wherein at least one of the at least two substrate layers is impregnated with silicone.

26. The fine fiber layer of claim 17 wherein at least one of the at least two substrate layers further comprises an adhesive.

27. The fine fiber layer of claim 17 wherein at least one of the at least two substrate layers is combined using adhesive lamination or heat lamination.

28. The fine fiber layer of claim 11 wherein the total thickness of the fine fiber layer and the substrate is about 50 microns to 4 millimeters.

29. The fine fiber layer of claim 11 wherein the total thickness of the fine fiber layer and the substrate is about 200 microns to 2 millimeters.

30. The fine fiber layer of claim 11 wherein the total thickness of the fine fiber layer and the substrate is about 500 microns to 1 millimeter.

31. The fine fiber layer of claim 11 wherein the total thickness of the fine fiber layer and the substrate is about 50 microns to 500 microns.

32. The fine fiber layer of claim 1 wherein the fine fiber layer has a total thickness of about 1 to 5 fiber diameters when the fine fiber layer is viewed at an angle 90° from the angle of fiber deposition.

33. The fine fiber layer of claim 1 wherein the fiber layer has a total thickness of about 1 micron to 30 microns when the fine fiber layer is viewed at an angle 90° from the angle of fiber deposition.

34. The fine fiber layer of claim 1 wherein the fiber layer has a total thickness of about 2 microns to 5 microns when the fine fiber layer is viewed at an angle 90° from the angle of fiber deposition.

35. The fine fiber layer of claim 1 wherein the fine fiber layer has a total thickness of less than 1 micron when the fine fiber layer is viewed at an angle 90° from the angle of fiber deposition.

36. The fine fiber layer of claim 1 wherein the fine fiber layer has a basis weight of about 0.1 grams per square meter to 2 grams per square meter.

37. The fine fiber layer of claim 1 wherein the air permeability of the fine fiber layer is about 0.1 $m^3/min/m^2$ to 5.0 $m^3/min/m^2$.

38. The fine fiber layer of claim 1 wherein the air permeability of the fine fiber layer is about 0.1 $m^3/min/m^2$ to 1.0 $m^3/min/m^2$.

39. The fine fiber layer of claim 1 wherein the air permeability of the fine fiber layer is about 0.2 $m^3/min/m^2$ to 0.5 $m^3/min/m^2$.

40. The fine fiber layer of claim 14 wherein the LEFS efficiency is at least 99% when measured with 0.8 micron latex particles at 20 feet per minute.

41. The fine fiber layer of claim 14 wherein the pressure drop is less than about 3 mm $H_2O$ at 20 feet per minute of air having 0.8 micron latex particles.

42. The fine fiber layer of claim 14 wherein the air flow through the fine fiber layer and substrate is at least 10 cfm at 125 Pa.

43. The fine fiber layer of claim 1 wherein the fluoropolymer is a fluoroelastomer.

44. The fine fiber layer of claim 1 wherein the contact angle of water on the surface of a fine fiber layer is greater than 120°.

45. The fine fiber layer of claim 1 wherein the contact angle of water on the surface of a fine fiber layer is at least 140°.

46. The fine fiber layer of claim 1 wherein the fine fiber layer is crosslinked.

47. The fine fiber of claim 1 wherein the crosslinking is accomplished using an electron beam.

48. The fine fiber of claim 47 wherein the fine fiber is exposed to electron beam radiation of at least about 400 KGy at 90 Kvolts.

49. The fine fiber of claim 47 wherein the fine fiber is exposed to electron beam radiation of at least about 1000 KGy at 90 Kvolts.

50. The fine fiber layer of claim 1 further comprising an additive.

51. The fine fiber layer of claim 50 wherein the additive comprises an antioxidant, an antibacterial agent, a flame retardant agent, or a colorant.

52. A fine fiber layer, comprising a fine fiber comprising a fluoropolymer comprising;
- a polymer comprising tetrafluoroethylene and hexafluoropropylene;
- a polymer comprising tetrafluoroethylene and a perfluorovinyl ether;
- a polymer comprising hexafluoropropylene, tetrafluoroethylene, and ethylene;
- a polymer comprising vinylidene fluoride, trifluoroethylene, and tetrafluoroethylene; or
- a polymer comprising a fluorinated acrylic monomer, wherein the fluorinated acrylic monomer is a fluorinated acrylate or methacrylate;

the fine fiber comprising a diameter of about 0.1 microns to 0.5 microns, the fine fiber layer comprising a thickness of about 0.3 microns to about 5 microns when the fine fiber layer is viewed at an angle 90° from the angle of fiber deposition, a basis weight of about 0.1 grams per square meter to about 2 grams per square meter, and air permeability of about $0.1 \text{ m}^3/\text{min}/\text{m}^2$ to $1.0 \text{ m}^3/\text{min}/\text{m}^2$.

53. The fine fiber layer of claim 52 wherein the fiber is disposed on a substrate comprising silicone impregnated cellulose.

54. The fine fiber layer of claim 52 wherein the fiber is electrospun from a solution comprising 9% weight percent of the fluoropolymer in acetone.

55. The fine fiber layer of claim 52 wherein the fine fiber and substrate are exposed to electron beam radiation of at least 400 KGy at 90 Kvolts.

* * * * *